(12) United States Patent
Kochersberger et al.

(10) Patent No.: US 12,703,517 B2
(45) Date of Patent: Aug. 11, 2026

(54) EXTENDED RANGE VERTICAL TAKE-OFF AND LANDING DRONE

(71) Applicant: VIRGINIA TECH INTELLECTUAL PROPERTIES, INC., Blacksburg, VA (US)

(72) Inventors: Kevin Kochersberger, Blacksburg, VA (US); Sarthak Deshmukh, Blacksburg, VA (US); Katie Marie Moncure, Fairfax, VA (US)

(73) Assignee: VIRGINIA TECH INTELLECTUAL PROPERTIES, INC., Blacksburg, VA (US)

( * ) Notice: Subject to any disclaimer, the term of this patent is extended or adjusted under 35 U.S.C. 154(b) by 0 days.

(21) Appl. No.: 18/949,543

(22) Filed: Nov. 15, 2024

(65) Prior Publication Data

US 2025/0153870 A1 May 15, 2025

Related U.S. Application Data

(60) Provisional application No. 63/599,396, filed on Nov. 15, 2023.

(51) Int. Cl.

*B64U 10/20* (2023.01)
*B64F 5/10* (2017.01)

(Continued)

(52) U.S. Cl.

CPC ................ *B64U 10/20* (2023.01); *B64F 5/10* (2017.01); *B64U 20/73* (2023.01); *B64U 20/77* (2023.01);

(Continued)

(58) Field of Classification Search

CPC ........ B64U 10/20; B64U 20/73; B64U 20/77; B64U 30/29; B64U 50/31; B64U 60/50; B64U 30/10; B64F 5/10

See application file for complete search history.

(56) References Cited

U.S. PATENT DOCUMENTS 7,959,104 B2 * 6/2011 Kuntz .................... A63H 27/12 244/50
9,540,101 B2 * 1/2017 Paduano .................. B64C 9/00

(Continued)

OTHER PUBLICATIONS

Ackerman, Evan. "ThereCraft's Lifting-Body Drone Acrobatically Delivers Packages With Pinpoint Accuracy: A unique drone design promises aircraft payload with helicopter precision." IEEE Spectrum, May 7, 2020.

(Continued)

*Primary Examiner* — Medhat Badawi

(74) *Attorney, Agent, or Firm* — Perilla Knox & Hildebrandt LLP; James J. Rha

(57) ABSTRACT

Various embodiments of a novel monocoque aerostructure quadcopter implemented as a vertical take-off and landing vehicle are described. In one example, a vertical take-off and landing vehicle includes a fuselage having a leading end positioned in a first horizontal plane and a trailing end positioned in a second horizontal plane that is vertically below the first horizontal plane. The vertical take-off and landing vehicle further includes a first arm assembly extending from the leading end of the fuselage in the first horizontal plane. The vertical take-off and landing vehicle further includes a second arm assembly extending from the trailing end of the fuselage in the second horizontal plane. The vertical take-off and landing vehicle further includes a first rotor assembly coupled to the first arm assembly and a second rotor assembly coupled to the second arm assembly.

8 Claims, 18 Drawing Sheets

(51) Int. Cl.

| | |
|---|---|
| ***B64U 20/73*** | (2023.01) |
| ***B64U 20/77*** | (2023.01) |
| ***B64U 30/29*** | (2023.01) |
| ***B64U 50/31*** | (2023.01) |
| ***B64U 60/50*** | (2023.01) |

(52) U.S. Cl.

CPC ............. *B64U 30/29* (2023.01); *B64U 50/31* (2023.01); *B64U 60/50* (2023.01)

(56) References Cited

U.S. PATENT DOCUMENTS 9,821,909 B2 * 11/2017 Moshe .................... B64C 27/22
10,370,095 B2 * 8/2019 Won ........................ B64C 29/02
10,413,763 B2 * 9/2019 Won ..................... A62C 3/0242
10,538,322 B2 * 1/2020 Alber ...................... B64C 29/02
10,800,521 B1 * 10/2020 Grenier .................. B64U 30/21
10,850,835 B2 * 12/2020 Hutson ............... B64C 29/0033
11,130,568 B2 * 9/2021 Morris ................... B64U 10/20
11,247,772 B2 * 2/2022 Won ........................ B64C 29/02
11,407,509 B2 * 8/2022 Kroo ................... B64C 29/0033
11,427,313 B2 * 8/2022 Bachmann .............. B64C 27/22
11,440,671 B2 * 9/2022 Kimchi ................. B64C 39/062
11,518,505 B1 * 12/2022 Bruell ....................... B64C 3/38
11,541,576 B1 * 1/2023 Page ......................... B64C 3/24
11,845,544 B2 * 12/2023 Campbell ............... B64C 29/02
11,851,173 B2 * 12/2023 Won ........................ B64C 29/02
11,939,050 B2 * 3/2024 Morris ................ B64C 29/0033
12,091,173 B2 * 9/2024 Woodworth .............. B64C 9/38
12,103,669 B2 * 10/2024 NakaMats ........... B64C 29/0033
12,134,470 B2 * 11/2024 Hymer .................. B64C 11/001
12,134,487 B2 * 11/2024 Moore .................. B64C 39/024
12,187,421 B2 * 1/2025 Won ........................ B64C 29/02
2006/0151666 A1 * 7/2006 VanderMey ........ B64C 29/0016
244/12.3
2009/0084890 A1 * 4/2009 Reinhardt ........... B64C 29/0033
244/12.4
2016/0122016 A1 * 5/2016 Mintchev ............. B64U 30/293
244/17.23
2016/0176520 A1 * 6/2016 Goldstein ............ B64U 30/293
244/17.23
2017/0088291 A1 * 3/2017 Hesse ..................... B64C 25/32
2017/0183081 A1 * 6/2017 Du ............................ B64C 1/30
2017/0334557 A1 * 11/2017 Alber .................... B64C 23/069
2017/0369162 A1 * 12/2017 Alzahrani .............. B64U 10/13
2018/0002003 A1 * 1/2018 Won ........................ B64C 29/02
2018/0105254 A1 * 4/2018 Tian ........................ B64C 27/50
2018/0118322 A1 * 5/2018 Harris ..................... B64U 50/19
2018/0281941 A1 * 10/2018 Hutson ............... B64C 29/0016
2018/0327092 A1 * 11/2018 Deng .................... B64C 39/024
2018/0354620 A1 * 12/2018 Baek ...................... B64U 30/20
2019/0071178 A1 * 3/2019 Caubel .................... B64C 27/50
2019/0084673 A1 * 3/2019 Chen ...................... B64U 20/50
2019/0112025 A1 * 4/2019 Sugaki .................... B64C 27/50
2019/0193844 A1 * 6/2019 Zheng .................... B64U 60/40
2019/0329880 A1 * 10/2019 Graves ................ B64C 29/0025
2020/0040936 A1 * 2/2020 Baskin .................... F16C 3/023
2020/0047877 A1 * 2/2020 Won ........................ B64C 29/02
2020/0079495 A1 * 3/2020 Yang ................... B64C 29/0033
2020/0079501 A1 * 3/2020 Graves ................... B64U 50/19
2020/0130803 A1 * 4/2020 Xiao ...................... B64U 80/00
2020/0164978 A1 * 5/2020 Perini .................... B64U 10/10
2020/0231277 A1 * 7/2020 Moore ................ B64C 29/0033
2020/0277040 A1 * 9/2020 Liu ........................ B64U 80/70
2020/0324885 A1 * 10/2020 Bernard ................. B64U 10/20
2020/0354049 A1 * 11/2020 Noppel ................. B64C 1/1407
2021/0078704 A1 * 3/2021 Blakstad ................ B64U 10/14
2022/0204152 A1 * 6/2022 Campbell .............. B64U 10/20
2022/0212779 A1 * 7/2022 Randall ...................... B64C 5/12
2022/0297828 A1 * 9/2022 Won ....................... B64D 27/06
2023/0015540 A1 * 1/2023 Wang ..................... A61K 39/00
2023/0091659 A1 * 3/2023 Kendall ................. B64U 50/31
701/11
2023/0092771 A1 * 3/2023 Page ......................... B64F 5/10
2023/0174232 A1 * 6/2023 Twyford ............. B64C 29/0025
244/6
2023/0202680 A1 * 6/2023 Yehya .................... B64U 70/30
244/110 E
2024/0076036 A1 * 3/2024 Won ....................... B64U 70/80
2024/0228071 A1 * 7/2024 Kozlenko ............. B64U 10/14
2024/0278943 A1 * 8/2024 Suzuki ................... B64U 20/77
2024/0351684 A1 * 10/2024 Suzuki ................... B64U 10/14
2025/0136272 A1 * 5/2025 Won ....................... B64U 70/80
2025/0153870 A1 * 5/2025 Kochersberger ....... B64U 60/50

OTHER PUBLICATIONS

Deshmukh, Sarthak; Tobisch, Oliver. Design, Experimental Flight Testing, and Wind Tunnel Analysis of the Quadfoil: A Novel Quadrotor Configuration. AIAA SciTech 2025 Forum, Jan. 2025. American Institute of Aeronautics and Astronautics (AIAA), United States.

Drela, Mark; Youngren, Harold. Xfoil: Subsonic Airfoil Development System. MIT Department of Aeronautics & Astronautics; Cambridge, Massachusetts, United States. Web publication: "web.mit.edu/drela/Public/web/xfoil/".

Kempel, Robert W.; Painter, Weneth D.; Thompson, Milton O. Developing and Flight Testing the HL-10 Lifting Body: A Precursor to the Space Shuttle. NASA Reference Publication 1332, Apr. 1994, 56 pages. National Aeronautics and Space Administration, Scientific and Technical Information Program; Edwards, California; Washington, D.C., United States.

Moncure, Katie Marie. The Design, Manufacturing, and Testing of a Novel Blended Wing Body Multirotor UAV for Public Safety Applications. Master's project, Virginia Polytechnic Institute and State University, May 12, 2023; Blacksburg, Virginia, United States.

Shakhatreh, Hazim; Sawalmeh, Ahmad H.; Al-Fuqaha, Ala; Dou, Zuochao; Almaita, Eyad; Khalil, Issa; Othman, Noor Shamsiah; Khreishah, Abdallah; Guizani, Mohsen. Unmanned Aerial Vehicles (UAVs): A Survey on Civil Applications and Key Research Challenges. IEEE Access, vol. 7, Apr. 9, 2019; pp. 48572-48634. Institute of Electrical and Electronics Engineers (IEEE), United States.

Staub, Franco; Tsukada, Dai; Inoue, Shosuke; Raabe, Chris; Tsuchiya, Takeshi. Modeling and Design of a Lift-Augmented Quadcopter. AIAA SciTech Forum 2021, Dec. 2020. American Institute of Aeronautics and Astronautics (AIAA), United States.

Theys, Bart; De Schutter, Joris. "Forward Flight Tests of a Quadcopter Unmanned Aerial Vehicle with Various Spherical Body Diameters." International Journal of Micro Air Vehicles, vol. 12, May 2020, Article 1756829320923565; IMAV 2019 Proceedings, 11th International Micro Air Vehicle Competition and Conference; Madrid, Spain; pp. 1-8.

U.S. Department of Energy. Alternative Fuels Data Center: Fuel Properties Comparison. DOE/GO-102024-6212, Mar. 2024. U.S. Department of Energy, Office of Energy Efficiency & Renewable Energy; United States.

Wainfan, Barnaby; Nieubert, Hans. Feasibility Study of the Low Aspect Ratio All-Lifting Configuration as a Low-Cost Personal Aircraft. NASA LARC NAG-1-03054 Task 01 Final Report, Feb. 2004. NASA Langley Research Center; United States.

* cited by examiner 100
110a
$H_1$
$H_2$
$H_3$
$H_4$
114a
106d
Trailing End
106a
125a
125b
125c
125d
125e
125f
Leading End
111
106b
106c
114b
110b
Z
Y 110c
114b
106c
106b
127
106a
106d
114a
110d

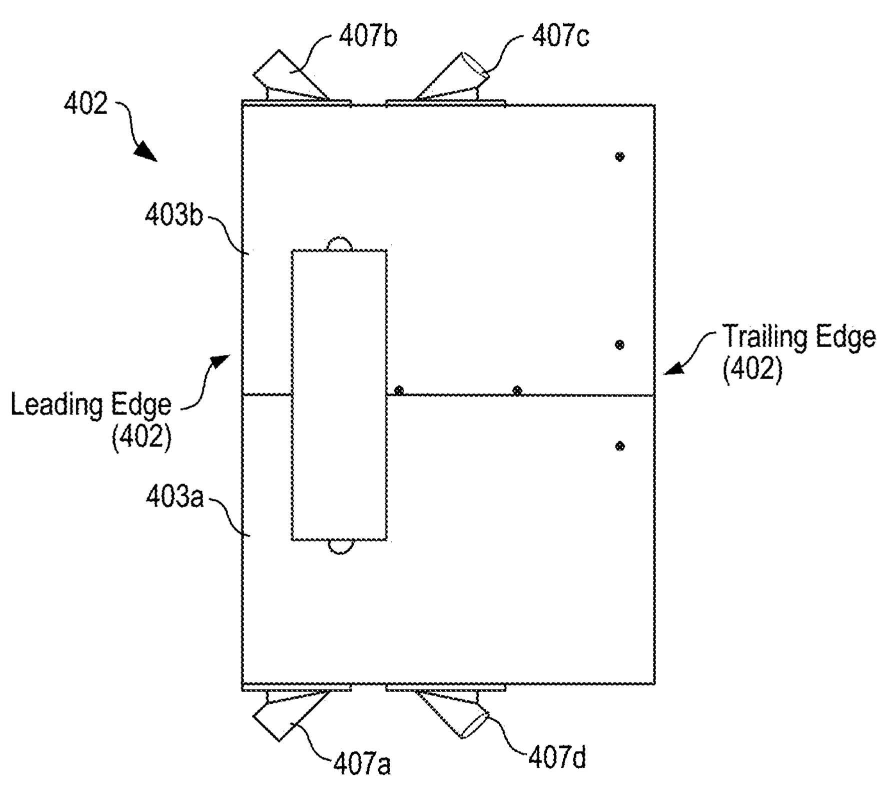
FIG. 4C
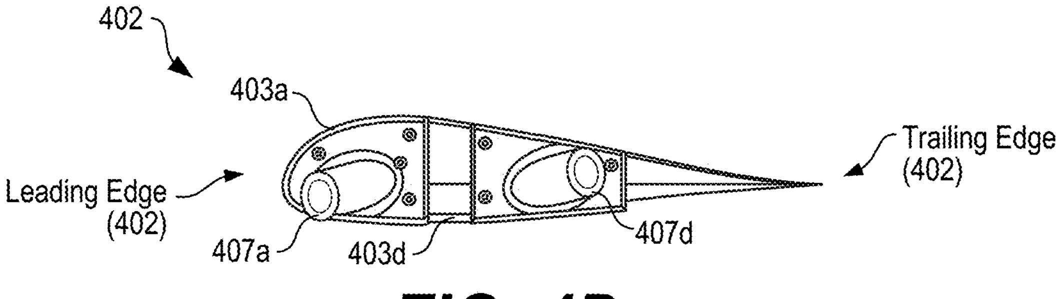
FIG. 4D
402
403a
403b
407d
407a
403d
403c
407c
407b
Trailing Edge
(402)
FIG. 4E Trailing Edge
(402)
402
413
403a
403d
Leading Edge
(402)

Trailing Edge
(402)
403d
403a 402
403b
Leading Edge
(402)

EXTENDED RANGE VERTICAL TAKE-OFF AND LANDING DRONE

CROSS REFERENCE TO RELATED APPLICATIONS

This application claims the benefit of and priority to U.S. Provisional Application Ser. No. 63/599,396, filed Nov. 15, 2023, and titled "NOVEL EXTENDED RANGE VERTICAL TAKE-OFF AND LANDING DRONE," the entire contents of which are hereby incorporated herein by reference.

BACKGROUND

Small unmanned and remotely piloted aircraft such as vertical take-off and landing (VTOL) vehicles have applications across a multitude of domains. VTOL vehicles such as drones, for example, are used by various government-affiliated and private sector health and safety workers, professionals, and researchers. In some circumstances drones can be mission critical for achieving certain health and safety operations or objectives. For instance, when a drone equipped with a camera is employed by law enforcement officers or firefighters during an emergency, the drone can help such first responders assess, mitigate, and resolve the emergency. For example, drones equipped with cameras help firefighters assess a fire by providing images or video from different vantage points in the sky while the firefighters are working on the ground to extinguish the fire. Drones are also relied upon by many universities to conduct various types of research across different departments, and they are used by mosquito control workers to survey and monitor mosquito habitats that typically include snakes, alligators, or other animals or dangers that could harm such workers.

BRIEF DESCRIPTION OF THE DRAWINGS

Many aspects of the present disclosure can be better understood with reference to the following figures. The components in the figures are not necessarily to scale, with emphasis instead being placed upon clearly illustrating the concepts of the disclosure. Moreover, repeated use of reference characters or numerals in the figures is intended to represent the same or analogous features, elements, or operations across different figures. Repeated description of such repeated reference characters or numerals is omitted for brevity.

FIG. 4C illustrates a top view of the example fuselage shown in FIG. 4A according to various aspects and embodiments of the present disclosure.

FIG. 4D illustrates a side view of the example fuselage shown in FIG. 4A according to various aspects and embodiments of the present disclosure.

FIG. 4E illustrates a back view of the example fuselage shown in FIG. 4A according to various aspects and embodiments of the present disclosure.

DETAILED DESCRIPTION

Figure 1A:
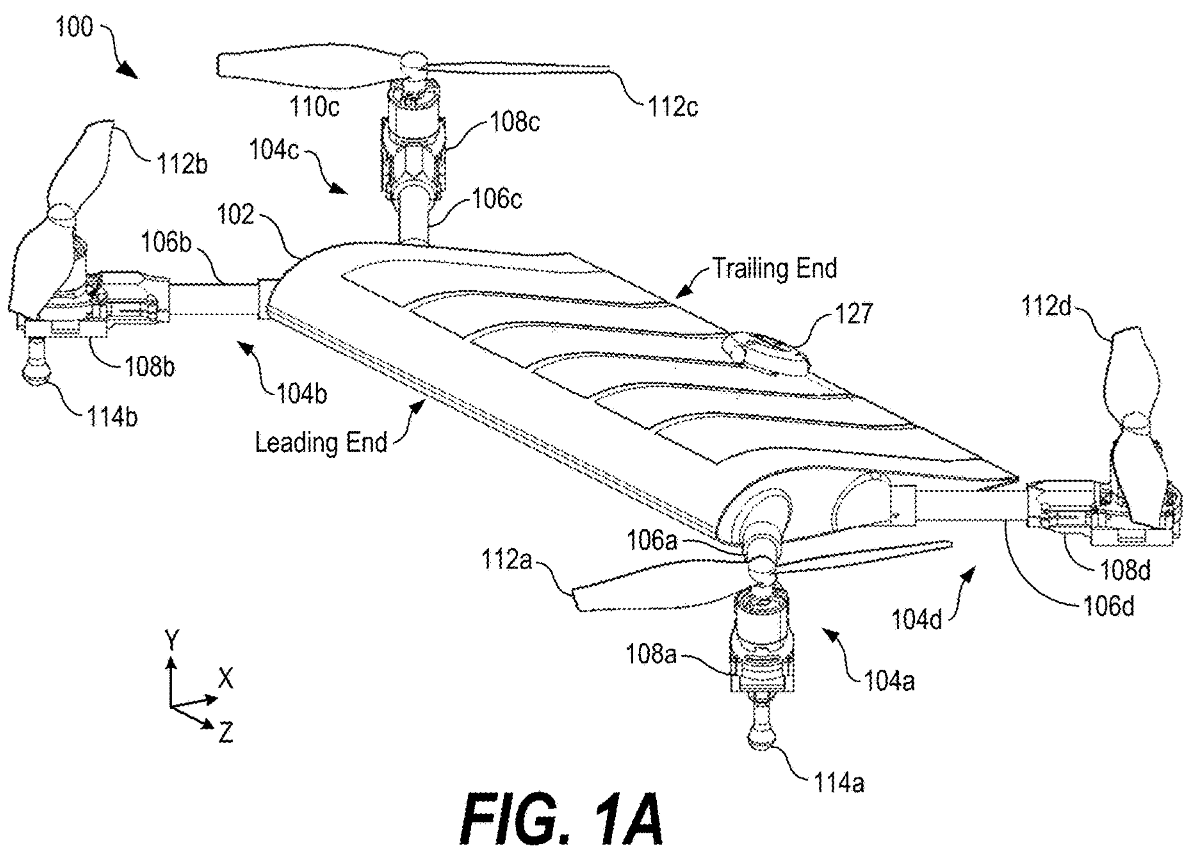
FIG. 1A illustrates a perspective view of an example VTOL vehicle according to various aspects and embodiments of the present disclosure.

The present disclosure is directed to various embodiments of a vertical take-off and landing (VTOL) vehicle having a novel small multirotor design. Example VTOL vehicles described herein can be embodied as a monocoque aerostructure quadcopter, a blended center body (BCB) quadcopter, or a monocoque BCB quadcopter. The VTOL vehicles have an aerodynamic design that is compatible with a wide range of payload types and several features that significantly enhance their aerodynamic efficiency, structural reliability, repairability, and versatility compared to currently available solutions. The VTOL vehicles have significantly better energy efficiency than comparable vehicles due to their unique, wing-shaped fuselage. One example VTOL vehicle was flight tested and found to be significantly more energy efficient at higher speeds compared to existing drones. The VTOL vehicles have applications across a multitude of domains such as government-affiliated public safety and research sectors, among others.

Another example VTOL vehicle can be fabricated using a three-dimensional (3D) printing device and process. The VTOL vehicle can include a 3D-printed wing-shaped fuselage having beneficial aerodynamic attributes. The VTOL vehicle may be designed and embodied to include an arm configuration with arms that are attached to the fuselage. The arms can be coupled to the fuselage in some examples by way of interchangeable or swappable 3D-printed brackets. The interchangeable brackets allow different arm configurations to be interchanged on the same fuselage. Such arm configuration interchangeability is beneficial when designing or operating the VTOL vehicle such as when determining optimal arm length and positioning.

One example VTOL vehicle can include an arm configuration with arms that are foldable, collapsible, rotatable, or otherwise moveable to allow them to respectively fold, collapse, rotate, or otherwise move toward a fuselage of the vehicle or into a portion of the fuselage. For instance, the arms can fold, collapse, rotate, or otherwise move toward respective sides of the fuselage, under or over the fuselage, or into a storage compartment formed in the fuselage. The arms can be completely removable and inserted into mechanical/electrical connections in the center body. Mounting hardware is used to couple any or all foldable, collapsible, rotatable, or otherwise moveable arms to a fuselage of a VTOL vehicle in some examples may be the same as that used in other examples to couple one or more fixed arms to a fuselage of another VTOL vehicle. Mounting hardware used to couple any or all foldable, collapsible, rotatable, or otherwise moveable arms to a fuselage of a VTOL vehicle in some cases may include hinges that are respectively coupled to one or more arms and the fuselage of the VTOL vehicle. In some examples, a VTOL vehicle can be embodied as a composite structure with arms that blend into a wing-shaped fuselage.

Another example VTOL vehicle can be designed and embodied to include a certain geometry or dimensions that allow the vehicle to be stowed and transported in a case having an approximate size of 20 inches (in)×15 in×4 in. However, other VTOL vehicles may be designed and embodied to be stowed and transported in cases having different sizes in other examples. The advantage of such a compact design of these VTOL vehicles is that they may be easily carried on-site and set up by a single operator.

Each VTOL vehicle embodiment described herein combines the benefits of multirotors and airplanes. Multirotors are capable of vertical takeoff and landing as well as hovering, which are beneficial features when access to a large, hard, and flat surface is not available for take-off and landing, when flying in a somewhat enclosed area like a city, and when performing tasks like inspections or surveillance that require the vehicle's position to be maintained for some period of time. Additionally, conventional small uncrewed or remotely piloted aircraft have significantly greater energy efficiency, which leads to greater range, endurance, and payload capacity. Each of the VTOL vehicles herein combine invaluable features of multirotors with some aerodynamic benefits of airplanes. The VTOL vehicles further enhance these aerodynamic benefits by incorporating monocoque aerostructures, BCB structures, or monocoque BCB structures to create a more efficient multirotor.

Small unmanned and remotely piloted aircraft can be mission critical to, for instance, health and safety professionals and researchers. However, due to various import or use restrictions put in place by different countries around the world, a considerable number of components used to manufacture many VTOLs are difficult or impossible to obtain for entities such as health and safety professionals and researchers operating in those countries. For example, nearly all drones currently used by health and safety professionals and researchers, as well as those used by a number of other individuals, enterprises, and governing bodies operating in the United States of America (USA) are manufactured in countries from which various drone components are restricted for import or use in the USA.

The VTOL vehicle embodiments described herein have applications in mapping, surveying, and aerial imaging in support of public safety, among other applications. These main use cases focus on the need for a small, portable aircraft that is easily set up, launched and commanded to fly its mission. As an aircraft capable of high endurance, the design is suitable for mapping and surveying work that requires large area or long distance flights. Agricultural operations would require an aircraft capable of flying over large areas to collect field data, including visual spectrum and multispectral images that give farmers intelligence about crop condition. Infrastructure mapping and monitoring can require drones to fly long distances BVLOS to perform routine inspections. Some of these applications include rail, electric and pipeline infrastructure. Public safety users desire aircraft that can survey large areas efficiently as this is needed in disaster response. Mapping areas that have been burned, flooded or otherwise disturbed is necessary to plan recovery and rebuilding, in addition to life-saving operations.

Most, if not all, of the applications above require a drone to be equipped with a camera for video or photography. The VTOL vehicle embodiments described herein are compatible with a variety of cameras for photography, videoing, and thermal imaging. Some of the applications above such as search and rescue also potentially require a drone to remain aloft for a long period of time and travel a substantial distance. A monocoque aerostructure quadcopter, a BCB quadcopter, and a monocoque BCB quadcopter of embodiments herein each provide a solution to such application requirements.

The VTOL vehicle embodiments described herein also have applications in fire safety, emergency medical services (EMS), and other areas of public or private health and safety that have unique needs that are not adequately fulfilled by currently available solutions. For example, some EMS workers have expressed interest in using drones to drop off emergency medical supplies, first responders have expressed interest in having drones that can perform radiation source localization, and other public safety workers have expressed interest in using drones for gas sampling. The VTOL vehicle embodiments herein provide solutions for achieving such objectives, as they may be designed and fabricated to various hardware, electrical, and software standards that allow them to be compatible with a wide range of payload types. The VTOL vehicles also have applications such as single camera payloads, mapping, and video and image collection. Long endurance loiter over an area for monitoring is one example public safety use case for the VTOL vehicle embodiments herein. Agriculture operators will also benefit as they need to image fields of several hundred acres which requires the endurance and range that each of the VTOL vehicle embodiments herein provide.

The VTOL vehicle embodiments may be designed such that they are scalable to larger variants that are suitable for cargo delivery. For instance, some embodiments including a monocoque structural design can be scaled up with minimal weight increase compared to the additional volume created by such a design. Also, the basic components of some VTOL vehicle embodiments described herein can be designed such that they are stackable, for example, top and bottom portions, which allows for easy transport of raw materials.

The VTOL vehicle embodiments herein are sturdy, easy to use, easy to maintain, and easy to repair. These features increase the longevity of the VTOL vehicles and improve user experience with them. Ease of maintenance and repair is also closely intertwined with ease of swapping out different internal or external payloads, which are features incorporated into various VTOL vehicle embodiments herein.

The VTOL vehicle embodiments described herein provide long range flight and high endurance that is compatible with many types of payloads and is easy to use and repair. Some VTOL vehicles can be designed and embodied to transport payloads that are positioned at one or more of an exterior location or an interior location on the vehicles. One example VTOL vehicle can include a cargo compartment formed in a fuselage of the vehicle. The VTOL vehicle can be designed and embodied to transport a payload that is at least partly or entirely located within the cargo compartment formed in the fuselage of the vehicle. The VTOL vehicle can fly for a duration of more than 25 minutes for a 1-kilogram (kg) payload in some cases, and a flight duration of more than 15 minutes for a 2 kg payload in other cases. Some VTOL vehicles can be embodied with relatively limited payload capacity such as 0.5 kg in some cases. Other VTOL vehicles can be designed and embodied to a desired payload that is smaller or larger than 0.5 kg in other examples.

The design of many VTOL vehicle embodiments described herein can be aerodynamically optimized such that they meet these requirements. For instance, a VTOL vehicle can include an airfoil-shaped fuselage that allows it to fly for relatively long periods of time by generating additional lift and blending the interface between the fuselage and arms of the vehicle to reduce form drag at these junctions. Such a VTOL vehicle can be thought of as a monocoque aerostructure quadcopter design, a blended center body (BCB) or a blended wing body (BWB) quadcopter design, or a monocoque BCB or BWB quadcopter design in many cases.

Some VTOL vehicles described herein can be designed and embodied such that they have a relatively small radar cross section (RCS). RCS testing of such a VTOL vehicle can show a relatively small return, indicating the vehicle can be stealthy and less visible or detectable compared to a many existing designs.

Leaders in the aerospace industry have called blended wing body aircraft "game-changers" ever since the late 1980s. Despite this, only 3 blended wing body aircraft are currently in service, all of which are for military applications. A brief description of the pros and cons of such aircraft is provided below to illustrate the challenges involved with implementing BWBs in aircraft in general and BCBs in VTOL vehicles in some cases. Example benefits associated with both BWBs and BCBs include greater aerodynamic efficiency, lower fuel burn, and lower takeoff weight for the same payload. Example challenges associated with these aircraft include difficulty satisfying passenger emergency egress requirements, non-circular pressure vessel that also results in a weight penalty, potential for poor airport compatibility due to greater wingspan and gust sensitivity, poor stability and control that requires a more complex flight control system, and manufacturing, maintenance, and repair concerns, including a reliance on composites and challenges associated with the novelty of implementing a BWB or BCB design in an aircraft.

The above benefits associated with the BCB design translate directly into greater energy efficiency. The VTOL vehicle embodiments herein that incorporate such a BCB design can fly longer and with greater payload than comparable vehicles.

Other design challenges that potentially remain applicable at the scale of a VTOL vehicle are those pertaining to stability and control. And it is also possible that there may be some BCB-associated challenges that are unique to aircraft of such small size. Below is a discussion pertaining to BCB-type aircraft that are on a scale more similar to some of the example VTOL vehicles described in various embodiments herein.

The world of small, remotely piloted vehicles seems to be poised in the perfect position to take advantage of monocoque aerostructures and blended wing structures. One source designed, built, and tested a small BWB unmanned aerial vehicle (UAV) that is about 85 centimeters (cm) diagonally and weighed about 2 kg. The primary objective of the source was to determine if the range and payload of multirotor UAVs could be significantly improved by enhancing their aerodynamic efficiency. The source took a pre-existing BWB aircraft, cut off the ends of the wings, and mounted it on a set of propellers and landing legs. However, the resulting UAV has a rounded fuselage that blends into the wings, which is unlike many of the VTOL vehicle embodiments of the present disclosure that have a pure flying wing fuselage. Additionally, the UAV developed by the source includes propellers that are tilted 10 degrees away from the fuselage on the lateral-vertical plane. This was done to improve yaw control performance, particularly in crosswind conditions. The source also optimized the mounting angle of the UAV's fuselage using numerical methods to maximize the vehicle's flight range in cruise. The source flew the UAV with and without the BWB fuselage and found that, at a cruise speed of 15 meters per second (m/s), the BWB version saved 50.14% power compared to the more conventional configuration. The source concluded that the effect of the propellers and the effect of the BWB fuselage were almost decoupled. The aircraft was controlled with a conventional multirotor UAV controller, and only experienced controllability issues at speeds above 20 m/s. No other issues with the BWB design were mentioned by the source.

Additionally, another source developed a composite tilt-rotor quadcopter with a fuselage comprised of a wing with flaperons and an avionics and payload bay underneath it. The quadcopter was designed to be an alternative to the manned helicopters and foot personnel that are currently used to inspect things such as oil pipelines, railroads, electric lines, and offshore wind farms, while being faster, less expensive, and more consistent. The quadcopter cruises around 33 m/s, and it has claimed performance times of up to 4 times longer than comparable rotary wing platforms.

Although there is very little literature regarding small multirotor BWBs, the sources above both show that an aerodynamic fuselage design can lead to significant gains in efficiency. Although, stability and control remain a potential concern at high speeds.

Further, monocoque construction has been used in aircraft since the 1930s to create strong, lightweight structures with large, enclosed volume. The above historical context on the BWB design related to full scale aircraft provides some background and basis for the monocoque aerostructure of several example VTOL vehicles described in embodiments herein.

For context, FIGS. 1A to 1F collectively illustrate different views of an example VTOL vehicle 100 according to various aspects and embodiments of the present disclosure. FIGS. 1A, 1B, 1C, 1D, 1E, and 1F illustrate a perspective, side, top, bottom, front, and back view, respectively, of the example VTOL vehicle 100 according to various aspects and embodiments of the present disclosure. A fuselage cover is removed from the VTOL vehicle 100 in FIG. 1D to illustrate example components located within the VTOL vehicle 100 according to various aspects and embodiments of the present disclosure.

The VTOL vehicle 100 is a representative example embodiment of a monocoque aerostructure quadcopter, a blended center body (BCB) or a blended wing body (BWB) quadcopter, or a monocoque BCB or BWB quadcopter of the present disclosure. The illustrations and descriptions of the VTOL vehicle 100 are provided herein for purposes of explanation and are not intended to be all inclusive or exhaustive with respect to other potential components or component configurations that may be implemented in other embodiments of the VTOL vehicle 100. Some embodiments of the VTOL vehicle 100 may include one or more additional or alternative components compared to those shown in FIGS. 1A to 1F. One or more components shown in FIGS. 1A to 1F may also be omitted from some embodiments of the VTOL vehicle 100.

With reference to FIGS. 1A to 1F, the VTOL vehicle 100 includes a fuselage 102 and arm assemblies 104*a*, 104*b*, 104*c*, 104*d* (or "the arm assemblies 104") that are each coupled to and extend from the fuselage 102. The fuselage 102 is embodied as an airfoil or an airfoil-shaped fuselage. For instance, the fuselage 102 is embodied as at least one of a monocoque aerostructure fuselage, a BCB fuselage, or a monocoque BCB fuselage. The fuselage 102 includes a bottom body panel 103*a*, a top body panel 103*b*, and fuselage sides 105*a*, 105*b* that are all coupled to one another to form an airfoil-shaped monocoque BCB aerostructure fuselage in the example shown. The top body panel 103*a* is positioned on and coupled to the bottom body panel 103*b*. The fuselage 102 includes a leading end or edge and a trailing end or edge that is positioned opposite the leading end. The fuselage sides 105*a*, 105*b* each extend vertically between the bottom body panel 103*a* and the top body panel 103*b* from the leading end to the trailing end of the fuselage 102. The fuselage sides 105*a*, 105*b* are oppositely positioned from one another on the fuselage 102 and each have an airfoil profile shape. As described further herein, each of the bottom body panel 103*a* and the top body panel 103*b* can be embodied as a thermoformed plastic panel in many examples such as a vacuum-thermoformed acrylonitrile butadiene styrene (ABS) plastic panel in some cases. Additionally, each of the fuselage sides 105*a*, 105*b* can be embodied in many examples as a discrete 3D printed end or rib plate, an end or rib portion of a 3D printed ribbed aerostructure, or an end or rib portion of another type of airfoil internal support structure.

The arm assemblies 104*a*, 104*b*, 104*c*, 104*d* are coupled to the fuselage 102 by way of mounting units 107*a*, 107*b*, 107*c*, 107*d* (or "mounting units 107"), respectively. For instance, the arm assemblies 104*a*, 104*d* are coupled to the fuselage side 105*a* by way of the mounting units 107*a*, 107*d*, respectively, and the arm assemblies 104*b*, 104*c* are coupled to the fuselage side 105*b* by way of the mounting units 107*c*, 107*d*, respectively. Each of the mounting units 107 is embodied as a rigid and fixed mounting bracket that is integrally formed with the fuselage sides 105 in the example shown. However, any or all of the mounting units 107 may be embodied in other examples as at least one of a pivotable, rotatable, or slidable mounting bracket, device, or hardware. Any or all of the mounting units 107 may be embodied as a modular component that may be coupled (e.g., mechanically, magnetically) to the fuselage sides 105 in some cases, and in other cases any or all of the mounting units 107 may be integrally formed with the fuselage sides 105.

The arm assemblies 104*a*, 104*b*, 104*c*, 104*d* respectively include rotor arms 106*a*, 106*b*, 106*c*, 106*d* (or "rotor arms 106") and rotor assemblies 108*a*, 108*b*, 108*c*, 108*d* (or "rotor assemblies 108") coupled to corresponding rotor arms 106. A first distal end of each of the rotor arms 106 is coupled to a corresponding mounting unit 107, and a second distal end of each of the rotor arms 106 is coupled to a corresponding rotor assembly 108. Any or all of the rotor arms 106 may be embodied as a carbon-epoxy tube in some examples. The rotor assemblies 108*a*, 108*b*, 108*c*, 108*d* respectively include motors 110*a*, 110*b*, 110*c*, 110*d* (or "motors 110") and propeller blades 112*a*, 112*b*, 112*c*, 112*d* (or "propeller blades 112") coupled to corresponding motors 110. Each of the rotor assemblies 108 may be controlled remotely (e.g., from a location on the ground) to provide the VTOL vehicle 100 with vertical take-off and landing ability and functionality.

Figure 1B:
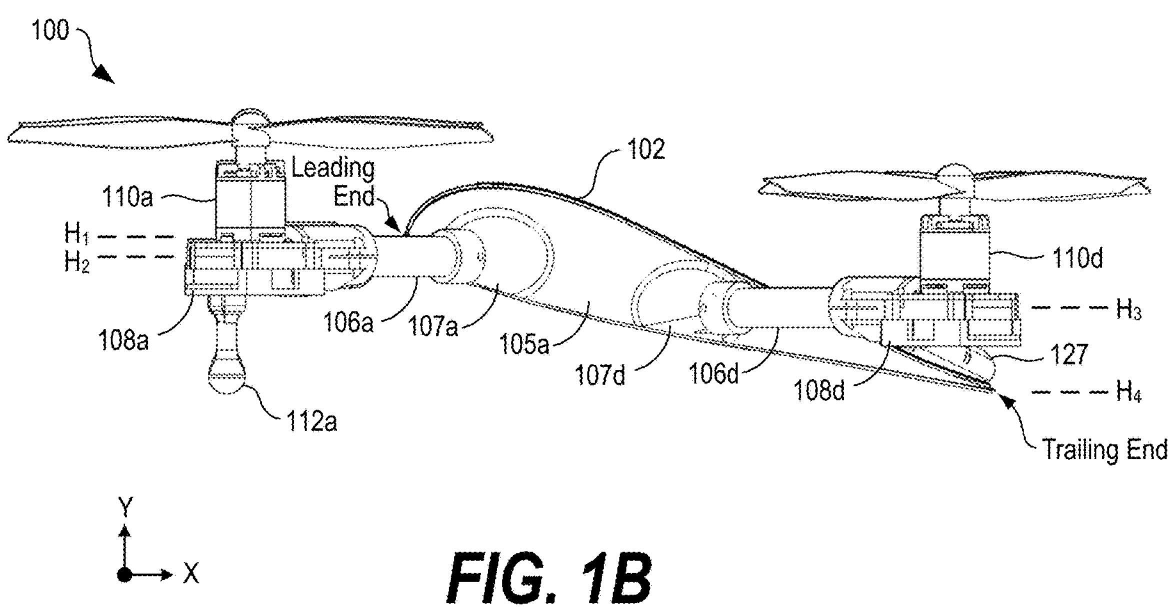
FIG. 1B illustrates a side view of the example VTOL vehicle shown in FIG. 1A according to various aspects and embodiments of the present disclosure.
Figure 1C:
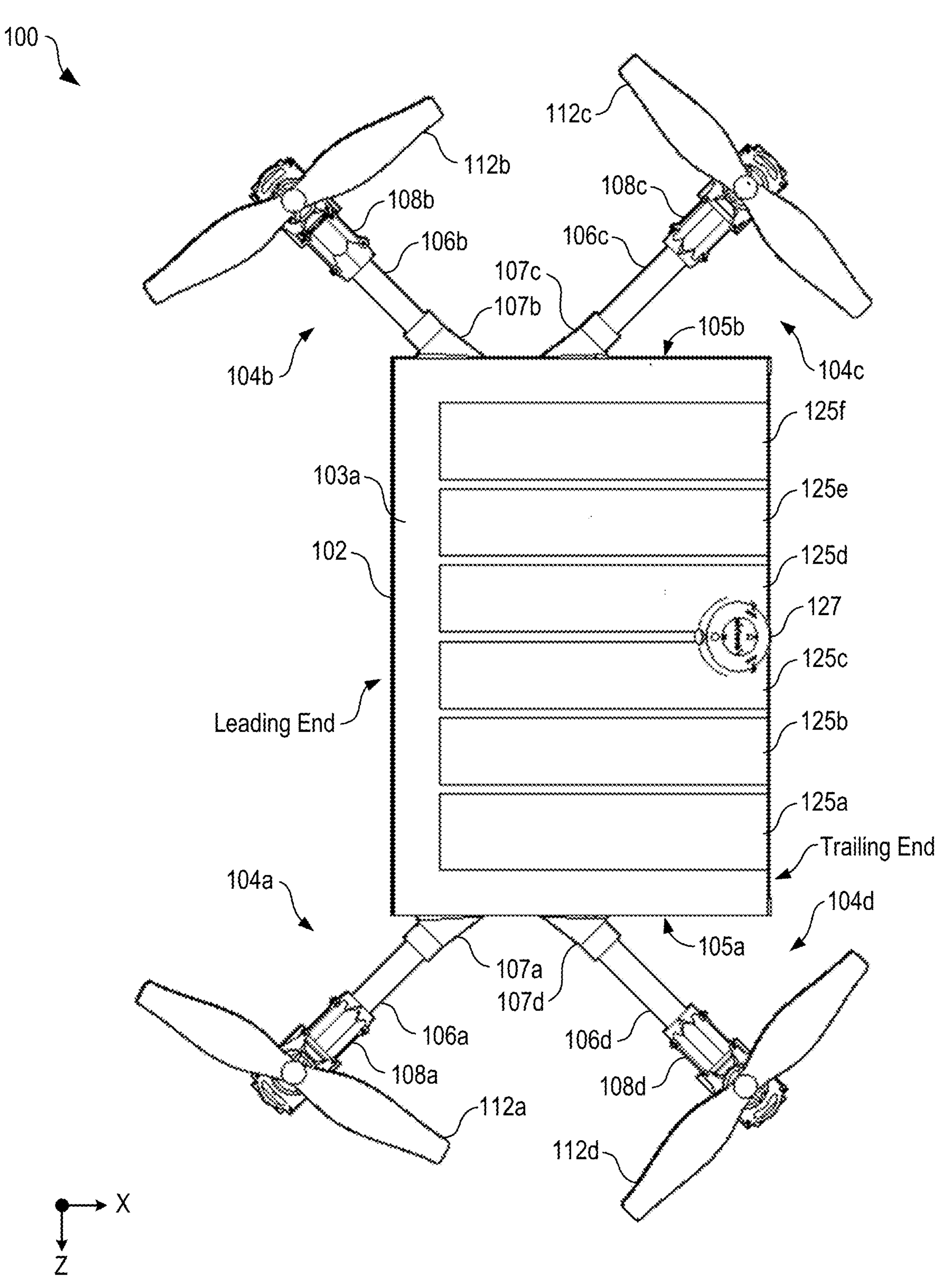
FIG. 1C illustrates a top view of the example VTOL vehicle shown in FIG. 1A according to various aspects and embodiments of the present disclosure.
Figure 1D:
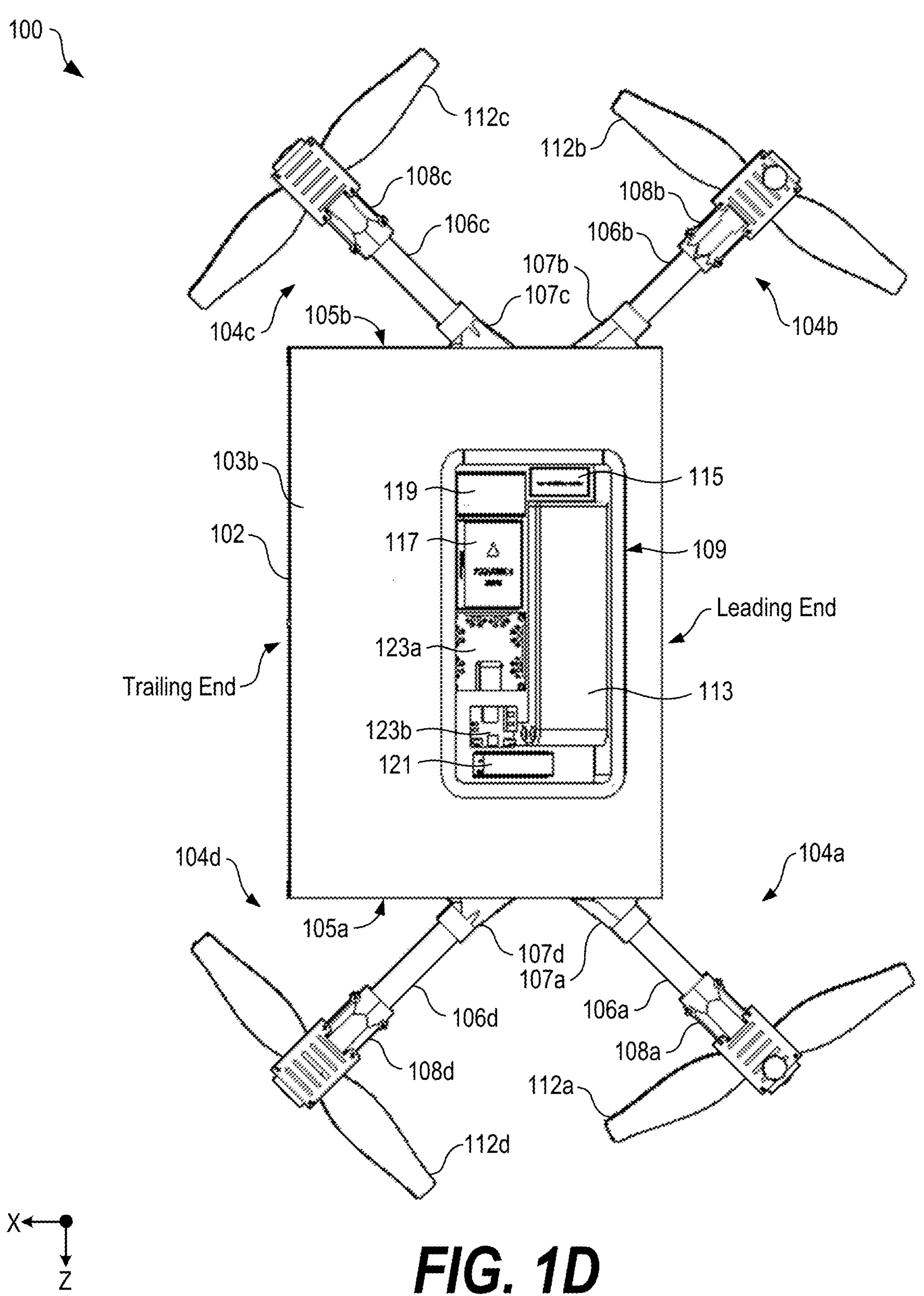
FIG. 1D illustrates a bottom view of the example VTOL vehicle shown in FIG. 1A according to various aspects and embodiments of the present disclosure.
Figures 1E, 1F:
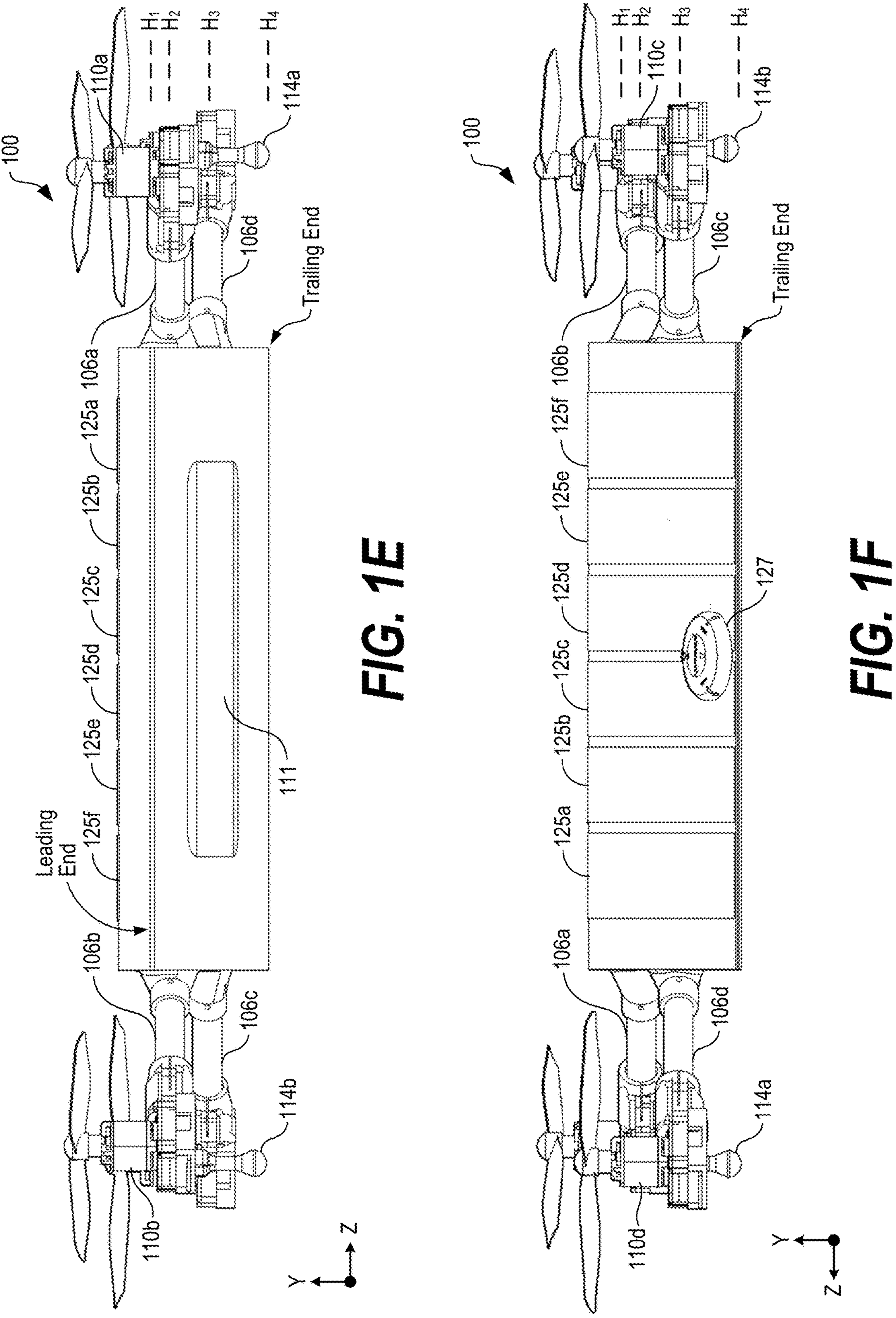
FIG. 1E illustrates a front view of the example VTOL vehicle shown in FIG. 1A according to various aspects and embodiments of the present disclosure.
FIG. 1F illustrates a back view of the example VTOL vehicle shown in FIG. 1A according to various aspects and embodiments of the present disclosure.
Figure 2A:
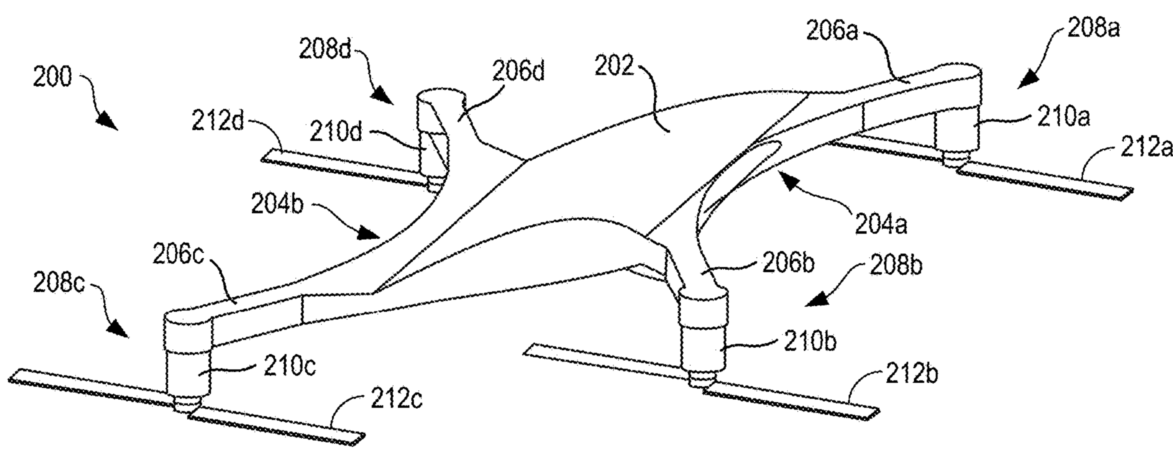
FIG. 2A illustrates a perspective view of another example VTOL vehicle according to various aspects and embodiments of the present disclosure.
Figure 2B:
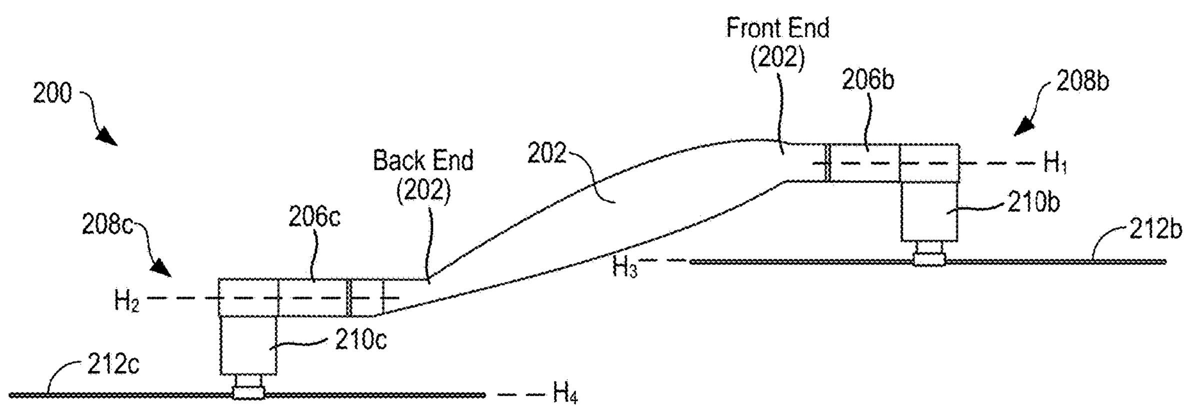
FIG. 2B illustrates a side view of the example VTOL vehicle shown in FIG. 2A according to various aspects and embodiments of the present disclosure.
Figure 2C:
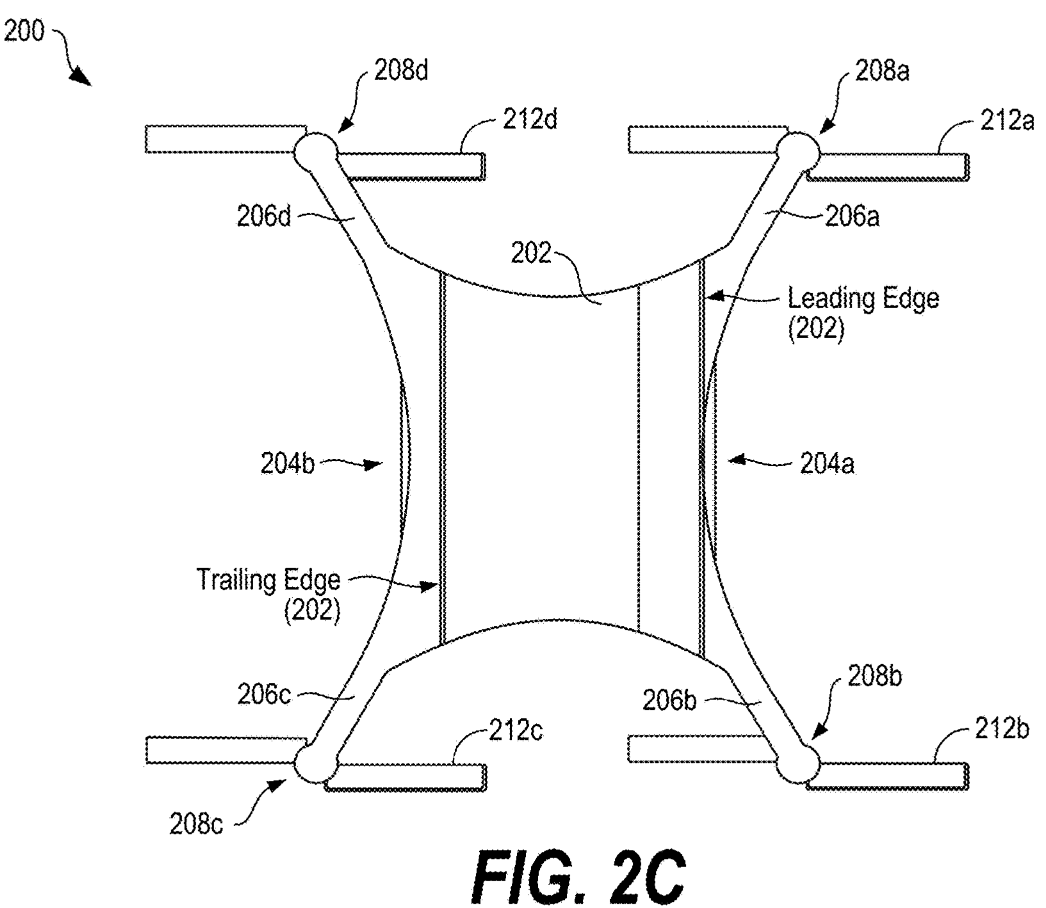
FIG. 2C illustrates a top view of the example VTOL vehicle shown in FIG. 2A according to various aspects and embodiments of the present disclosure.
Figure 2D:
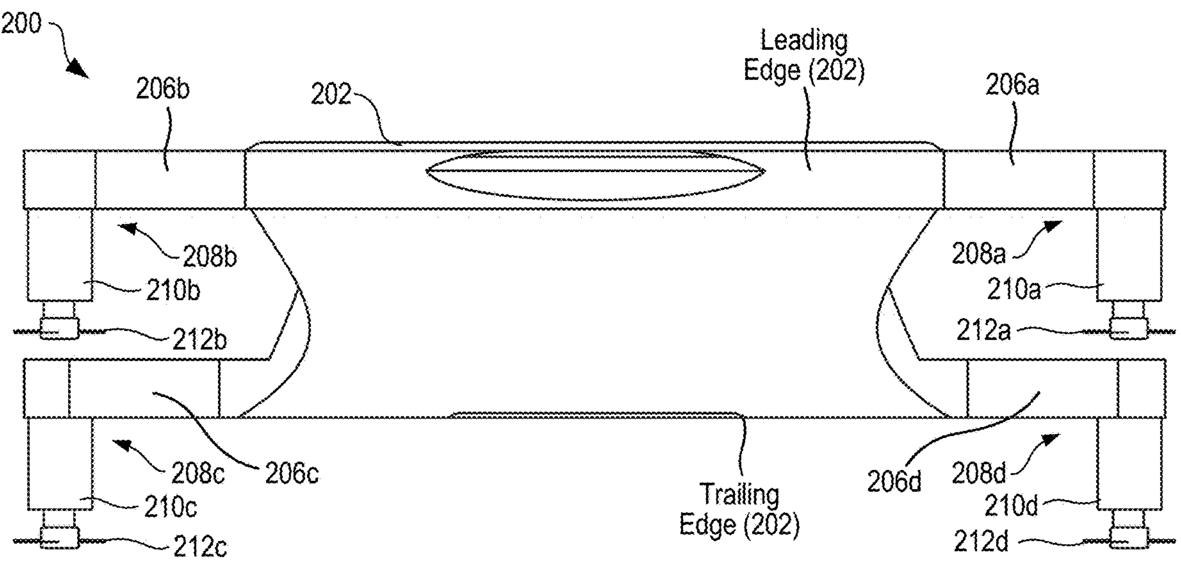
FIG. 2D illustrates a front view of the example VTOL vehicle shown in FIG. 2A according to various aspects and embodiments of the present disclosure.

The leading end or edge of the fuselage 102 is positioned in a first horizontal plane ("$H_1$"). A centerline of each of the arm assemblies 104*a*, 104*b* is positioned in a second horizontal plane ("$H_2$") that is located vertically below the first horizontal plane $H_1$. For example, a centerline of each of the rotor arms 106*a*, 106*b* is positioned in the second horizontal plane $H_2$ as illustrated in FIGS. 1B, 1E, and 1F. Each of the rotor arms 106*a*, 106*b* extends from the fuselage side 105*a* in the second horizontal plane $H_2$. A centerline of each of the arm assemblies 104*c*, 104*d* is positioned in a third horizontal plane ("$H_3$") that is located vertically below the first horizontal plane $H_1$ and the second horizontal plane $H_2$. For example, a centerline of each of the rotor arms 106*c*, 106*d* is positioned in the third horizontal plane $H_3$ as illustrated in FIGS. 1B, 1E, and 1F. Each of the rotor arms 106*c*, 106*d* extends from the fuselage side 105*b* in the third horizontal plane $H_3$. The trailing end of the fuselage 102 is positioned in a fourth horizontal plane ("$H_4$") that is vertically below the first horizontal plane $H_1$, the second horizontal plane $H_2$, and the third horizontal plane $H_3$.

The VTOL vehicle 100 further includes landing legs 114*a*, 114*b* (or "landing legs 114") coupled to a bottom side of the rotor assemblies 108*a*, 108*b*, respectively. In addition to or in place of the landing legs 114*a*, 114*b*, the VTOL vehicle 100 may include one or more landing legs 114 coupled to a portion of the fuselage 102 such as a bottom side of the fuselage 102 in other examples. Each of the landing legs 114*a*, 114*b* is embodied as a rigid and fixed landing leg in the example shown. However, either or both of the landing legs 114*a*, 114*b* may be embodied in other examples as at least one of a pivotable, rotatable, or slidable landing leg. Either or both of the landing legs 114*a*, 114*b* may be embodied as a modular component that may be coupled (e.g., mechanically, magnetically) to its corresponding rotor assembly 108 in some cases, and in other cases one or both of the landing legs 114*a*, 114*b* may be integrally formed with its corresponding rotor assembly 108.

The fuselage 102 also includes a fuselage compartment 109 formed at least partly in the bottom body panel 103*a* and a fuselage compartment cover 111 that encloses the fuselage compartment 109 when the fuselage compartment cover 111 is in a closed position. The fuselage compartment 109 in this example includes various power and control components for operating the VTOL vehicle 100. For instance, the fuselage compartment 109 includes components of a power storage system such as a battery 113 and a solar panel charging module 115. The solar panel charging module 115 can be coupled (e.g., electrically, operatively) to the battery 113 in some cases. At least one of the battery 113 or the solar panel charging module 115 can be coupled (e.g., electrically, operatively, communicatively) in many examples to one or more components of the VTOL vehicle 100 such as the motors 110 or other components described herein. The fuselage compartment 109 also includes a flight controller 117, a telemetry system 119, a transceiver 121, and circuit boards 123*a*, 123*b* that are each coupled (e.g., electrically, operatively, communicatively) to one or more components in the fuselage compartment 109 or other components of the VTOL vehicle 100.

The fuselage 102 further includes solar panels 125*a*, 125*b*, 125*c*, 125*d*, 125*e*, 125*f* (or "solar panels 125") and an antenna 127 (e.g., a global positioning system (GPS) antenna) coupled (e.g., mechanically, magnetically) to an outer surface of the top body panel 103*b*. Any or all of the solar panels 125 can be coupled (e.g., electrically, operatively) to at least one of the battery 113 or the solar panel charging module 115. Any or all of the solar panels 125 can be embodied as a 7 Watt (W) solar panel in many cases.

FIGS. 2A to 2D collectively illustrate different views of another example VTOL vehicle 200 according to various aspects and embodiments of the present disclosure. FIGS. 2A, 2B, 2C, and 2D illustrate a perspective, side, top, and front view, respectively, of the example VTOL vehicle 200 according to various aspects and embodiments of the present disclosure. The VTOL vehicle 200 is an alternative example embodiment of the VTOL vehicle 100.

The VTOL vehicle 200 is another representative example embodiment of a monocoque aerostructure quadcopter, a BCB quadcopter, or a monocoque BCB quadcopter of the present disclosure. The illustrations and descriptions of the VTOL vehicle 200 are provided herein for purposes of explanation and are not intended to be all inclusive or exhaustive with respect to other potential components or component configurations that may be implemented in other embodiments of the VTOL vehicle 200. Some embodiments of the VTOL vehicle 200 may include one or more additional or alternative components compared to those shown in FIGS. 2A to 2D. One or more components shown in FIGS. 2A to 2D may also be omitted from some embodiments of the VTOL vehicle 200.

With reference to FIGS. 2A to 2D, the VTOL vehicle 200 includes a fuselage 202, arm assemblies 204*a*, 204*b* (or "arm assemblies 204"), rotor arms 206*a*, 206*b*, 206*c*, 206*d* (or "rotor arms 206"), rotor assemblies 208*a*, 208*b*, 208*c*, 208*d* (or "rotor assemblies 208"), motors 210*a*, 210*b*, 210*c*, 210*d* (or "motors 210"), and propeller blades 212*a*, 212*b*, 212*c*, 212*d* (or "propeller blades 212"). The fuselage 202 includes a front or leading end positioned in a first horizontal plane ("$H_1$") and a back or trailing end positioned in a second horizontal plane ("$H_2$") that is vertically below the first horizontal plane. The arm assembly 204*a* extends from the front end of the fuselage 202 in the first horizontal plane $H_1$ and the arm assembly 204*b* extends from the back end of the fuselage in the second horizontal plane $H_2$. The rotor assemblies 208*a*, 208*b*, 208*c*, 208*d* are respectively coupled to the rotor arms 206*a*, 206*b*, 206*c*, 206*d*. For instance, the rotor assemblies 208*a*, 208*b* are each coupled to the arm assembly 204*a* and the rotor assemblies 208*c*, 208*d* are each coupled to the arm assembly 204*b*. Each of the rotor assemblies 208*a*, 208*b*, 208*c*, 208*d* includes a corresponding motor 210*a*, 210*b*, 210*c*, 210*d*, and a corresponding propeller blade 212*a*, 212*b*, 212*c*, 212*d*. Each of the rotor assemblies 208*a*, 208*b*, 208*c*, 208*d* may be controlled remotely (e.g., from a location on the ground) to provide the VTOL vehicle 200 with vertical take-off and landing ability and functionality.

In the example illustrated in FIGS. 2A to 2D, the fuselage 202 is embodied as an airfoil or an airfoil-shaped fuselage. For instance, the fuselage 202 is embodied as at least one of a monocoque aerostructure fuselage, a BCB fuselage, or a monocoque BCB fuselage in the example shown. Each of the propeller blades 212*a*, 212*b* of the rotor assemblies 208*a*, 208*b*, respectively, is positioned in a third horizontal plane ("$H_3$") located between the first horizontal plane $H_1$ and the second horizontal plane $H_2$. Each of the propeller blades 212*c*, 212*d* of the rotor assemblies 208*c*, 208*d*, respectively, is positioned in a fourth horizontal plane ("$H_4$") located below the second horizontal plane $H_2$. The third horizontal plane $H_3$ is located vertically above and parallel to the fourth horizontal plane $H_4$ in this example.

The VTOL vehicle 200 may also include at least one landing leg in some embodiments. For example, one or more landing legs may be coupled to a portion of the fuselage 202 such as a bottom region of the fuselage 202 in some cases. The fuselage 202 may also include a battery that is operatively and electrically coupled to each of the rotor assemblies 208*a*, 208*b*, 208*c*, 208*d* (e.g., to each motor of the rotor assemblies 208*a*, 208*b*, 208*c*, 208*d*) in some examples.

The monocoque aerostructure of the VTOL vehicle 200 shown in this example includes simple body panels that can be easily removed, replaced, and/or repaired. In one embodiment, the monocoque aerostructure of the VTOL vehicle 200 can be formed using a carbon epoxy (C-E) material, although other materials may be relied upon in some cases. Carbon epoxy construction of the VTOL vehicle 200 is a relatively easy process for such a vehicle and it allows for the vehicle and components thereof to be strong and lightweight. Construction of these components in C-E can be accomplished, for instance, with a wet layup technique. The wet layup process according to one example starts with a mold that is cut using a computer numerical control (CNC) machine and process. Next, carbon cloth is laid out in the mold and coated with epoxy. Then a vacuum bagging system is used to apply pressure to the C-E part being fabricated while the C-E cures. The simple geometry of the VTOL vehicle 200 in the example shown will allow the vehicle to be built nearly anywhere with minimal tooling. Once the C-E components are fabricated, they can be stacked and shipped very efficiently to allow for high density packaging, for example, of the VTOL vehicle 200.

Figure 3A:
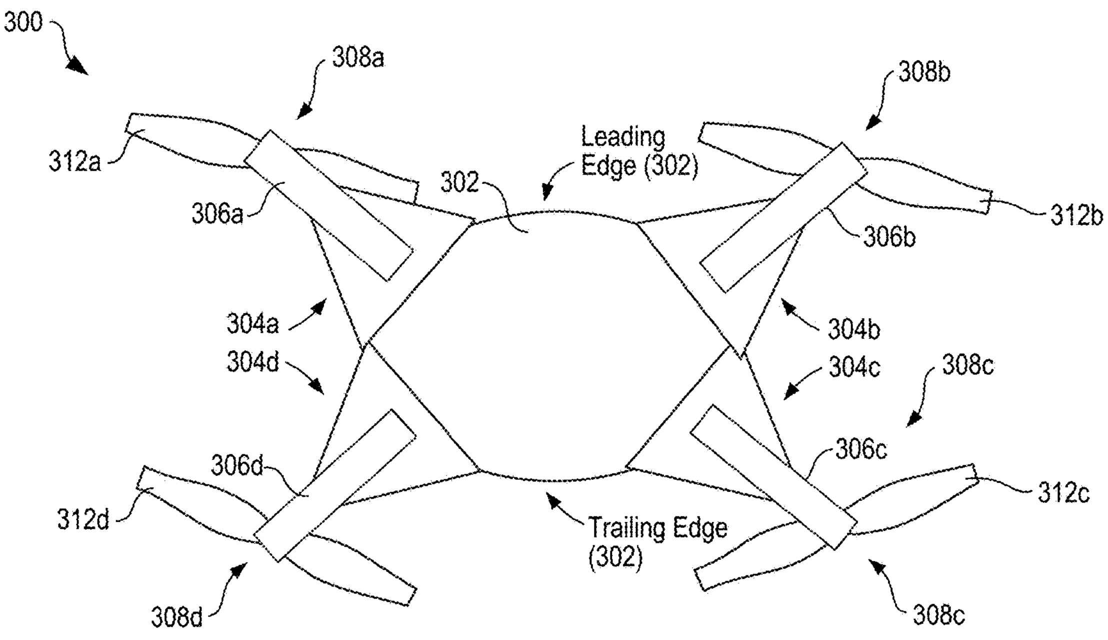
FIG. 3A illustrates a perspective view of another example VTOL vehicle according to various aspects and embodiments of the present disclosure.
Figure 3B:
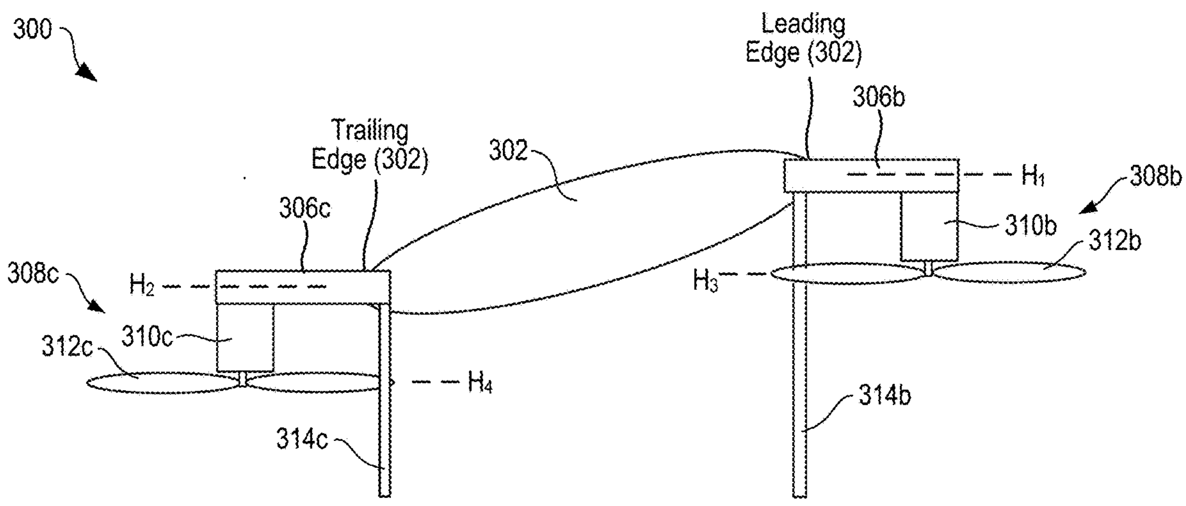
FIG. 3B illustrates a side view of the example VTOL vehicle shown in FIG. 3A according to various aspects and embodiments of the present disclosure.

FIGS. 3A and 3B collectively illustrate different views of another example VTOL vehicle 300 according to various aspects and embodiments of the present disclosure. FIGS. 3A and 3B illustrate a top and side view, respectively, of the example VTOL vehicle 300 according to various aspects and embodiments of the present disclosure. The VTOL vehicle 300 is another alternative example embodiment of the VTOL vehicle 100.

The VTOL vehicle 300 is another representative example embodiment of a monocoque aerostructure quadcopter, a BCB quadcopter, or a monocoque BCB quadcopter of the present disclosure. The illustrations and descriptions of the VTOL vehicle 300 are provided herein for purposes of explanation and are not intended to be all inclusive or exhaustive with respect to other potential components or component configurations that may be implemented in other embodiments of the VTOL vehicle 300. Some embodiments of the VTOL vehicle 300 may include one or more additional or alternative components compared to those shown in FIGS. 3A to 3B. One or more components shown in FIGS. 3A to 3B may also be omitted from some embodiments of the VTOL vehicle 300.

With reference to FIGS. 3A and 3B, the VTOL vehicle 300 includes a fuselage 302, arm assemblies 304*a*, 304*b*, 304*c*, 304*d* (or "arm assemblies 304"), rotor arms 306*a*, 306*b*, 306*c*, 306*d* (or "arms 306"), rotor assemblies 308*a*, 308*b*, 308*c*, 308*d* (or "rotor assemblies 308"), motors 310*a*, 310*b*, 310*c*, 310*d* (or "motors 310"), propeller blades 312*a*, 312*b*, 312*c*, 312*d* (or "propeller blades 312"), and landing legs 314*a*, 314*b*, 314*c*, 314*d*. Only the motors 310*b*, 310*c* are illustrated in FIGS. 3A and 3B. The fuselage 302 includes a front or leading end positioned in a first horizontal plane ("$H_1$") and a back or trailing end positioned in a second horizontal plane ("$H_2$") that is vertically below the first horizontal plane. The arm assemblies 304*a*, 304*b* each extend from the front end of the fuselage 302 in the first horizontal plane $H_1$ and the arm assemblies 304*c*, 304*d* each extend from the back end of the fuselage 302 in the second horizontal plane $H_2$. The rotor assemblies 308*a*, 308*b*, 308*c*, 308*d* are respectively coupled to the arms 306*a*, 306*b*, 306*c*, 306*d*. For instance, the rotor assemblies 308*a*, 308*b* are coupled to the arm assemblies 304*a*, 304*b*, respectively, and the rotor assemblies 308*c*, 308*d* are coupled to the arm assemblies 304*c*, 304*d*. Each of the rotor assemblies 308*a*, 308*b*, 308*c*, 308*d* includes a corresponding motor 310*a*, 310*b*, 310*c*, 310*d* and a corresponding propeller blade 312*a*, 312*b*, 312*c*, 312*d*. Each of the rotor assemblies 308*a*, 308*b*, 308*c*, 308*d* may be controlled remotely (e.g., from a location on the ground) to provide the VTOL vehicle 300 with vertical take-off and landing ability and functionality.

In the example illustrated in FIGS. 3A and 3B, the fuselage 302 is embodied as an airfoil or an airfoil-shaped fuselage. For instance, the fuselage 302 is embodied as at least one of a monocoque aerostructure fuselage, a BCB fuselage, or a monocoque BCB fuselage in the example shown. Each of the propeller blades 312*a*, 312*b* of the rotor assemblies 308*a*, 308*b*, respectively, is positioned in a third horizontal plane ("$H_3$") located between the first horizontal plane $H_1$ and the second horizontal plane $H_2$. Each of the propeller blades 312*c*, 312*d* of the rotor assemblies 308*c*, 308*d*, respectively, is positioned in a fourth horizontal plane ("$H_4$") located below the second horizontal plane $H_2$. In this example, the third horizontal plane $H_3$ is located vertically above and parallel to the fourth horizontal plane $H_4$.

The landing legs 314*a*, 314*b*, 314*c*, 314*d* in the example shown are each coupled to and extend in a vertical downward direction from one or more components of the VTOL vehicle 300 such as at least one of the fuselage 302, the arm assemblies 304*a*, 304*b*, 304*c*, 304*d*, or the rotor arms 306*a*, 306*b*, 306*c*, 306*d*. For example, each of the landing legs 314*a*, 314*b*, 314*c*, 314*d* are coupled to and extend from a bottom portion of at least one of the fuselage 302, the arm assemblies 304*a*, 304*b*, 304*c*, 304*d*, or the rotor arms 306*a*, 306*b*, 306*c*, 306*d*. In some embodiments, the fuselage 302 may include a battery that is operatively and electrically coupled to each of the rotor assemblies 308*a*, 308*b*, 308*c*, 308*d* (e.g., to the motors 310*a*, 310*b*, 310*c*, 310*d* of the rotor assemblies 308*a*, 308*b*, 308*c*, 308*d*, respectively).

Figure 4A:
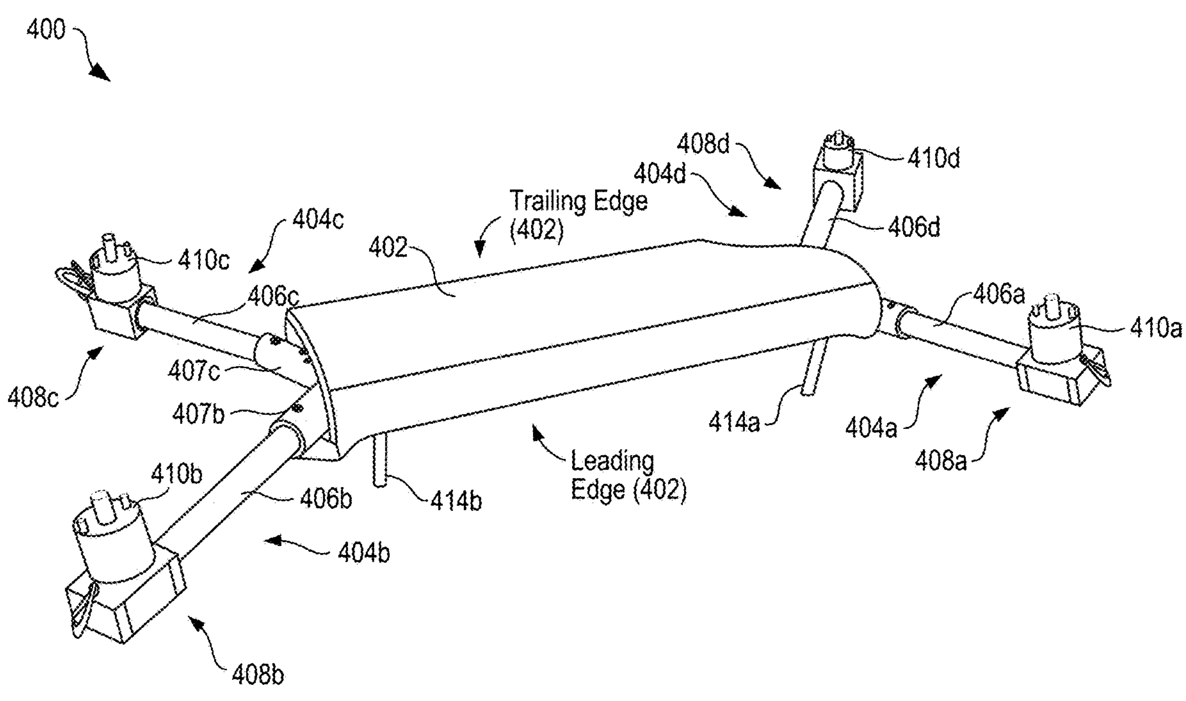
FIG. 4A illustrates a perspective view of another example VTOL vehicle according to various aspects and embodiments of the present disclosure.
Figure 4B:
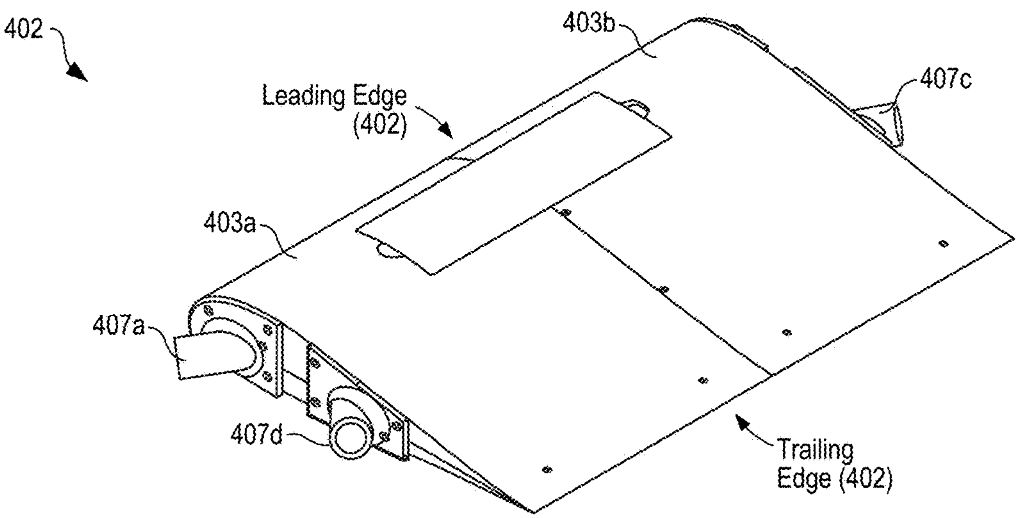
FIG. 4B illustrates a perspective view of an example fuselage of the example VTOL vehicle shown in FIG. 4A according to various aspects and embodiments of the present disclosure.
Figures 4F, 4G:
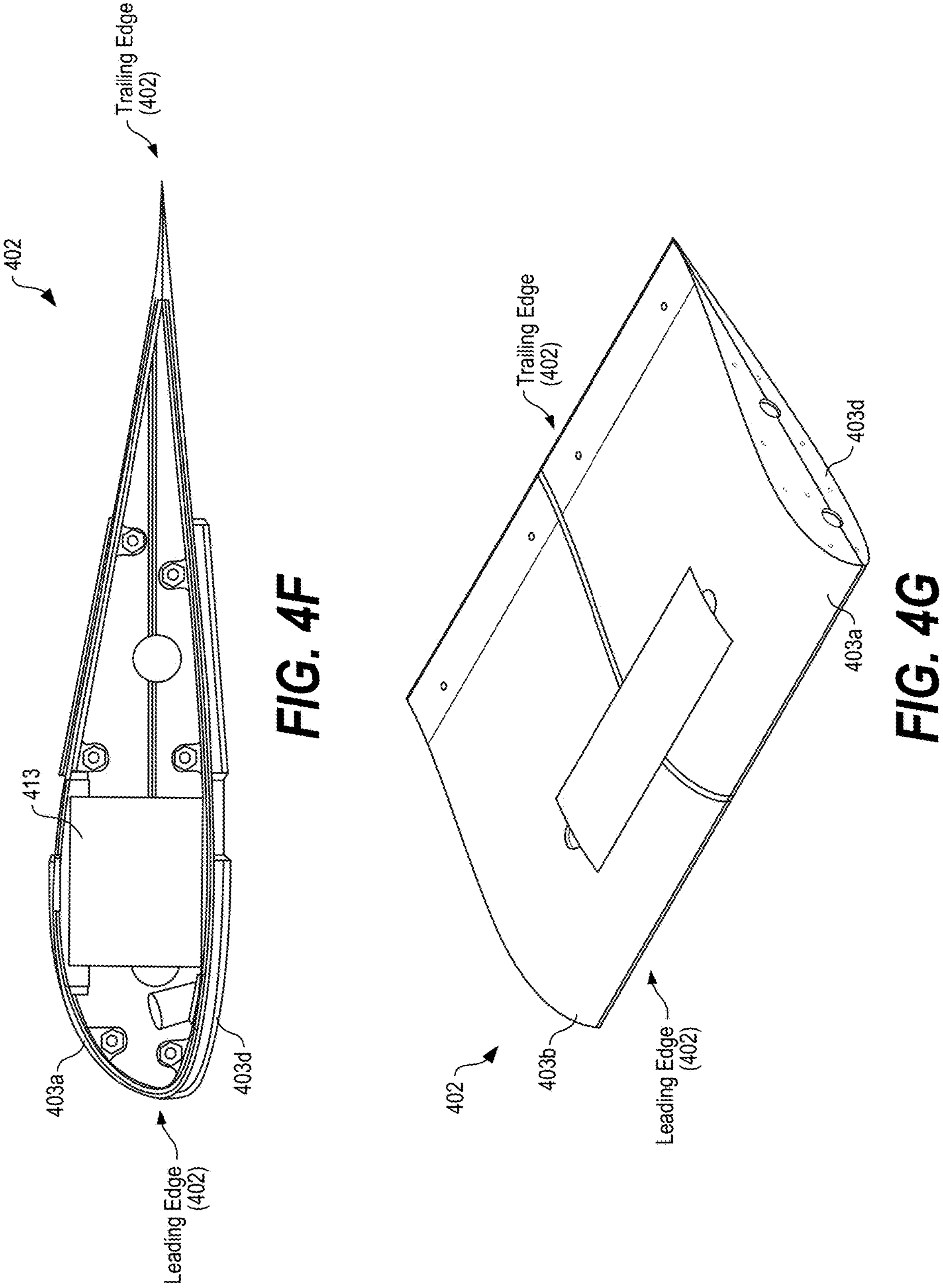
FIG. 4F illustrates a cross-sectional view of the example fuselage shown in FIG. 4A according to various aspects and embodiments of the present disclosure.
FIG. 4G illustrates another perspective view of the example fuselage shown in FIG. 4A with certain components being removed according to various aspects and embodiments of the present disclosure.

FIGS. 4A to 4G collectively illustrate different views of another example VTOL vehicle 400 according to various aspects and embodiments of the present disclosure. FIG. 4A illustrates a perspective view of the VTOL vehicle 400 according to various aspects and embodiments of the present disclosure. FIGS. 4B, 4C, 4D, and 4E illustrate a perspective, top, side, and back view, respectively, of an example fuselage 402 of the VTOL vehicle 400 shown in FIG. 4A according to various aspects and embodiments of the present disclosure. FIG. 4F illustrates a cross-sectional view of an example fuselage 402 of the VTOL vehicle 400 shown in FIG. 4A according to various aspects and embodiments of the present disclosure. FIG. 4G illustrates another perspective view of the example fuselage 402 shown in FIG. 4A with certain components being removed according to various aspects and embodiments of the present disclosure. The VTOL vehicle 400 is another alternative example embodiment of the VTOL vehicle 100.

The VTOL vehicle 400 is another representative example embodiment of a monocoque aerostructure quadcopter, a BCB quadcopter, or a monocoque BCB quadcopter of the present disclosure. The illustrations and descriptions of the VTOL vehicle 400 are provided herein for purposes of explanation and are not intended to be all inclusive or exhaustive with respect to other potential components or component configurations that may be implemented in other embodiments of the VTOL vehicle 400. Some embodiments of the VTOL vehicle 400 may include one or more additional or alternative components compared to those shown in FIGS. 4A to 4G. One or more components shown in FIGS. 4A to 4G may also be omitted from some embodiments of the VTOL vehicle 400.

With reference to FIGS. 4A to 4G, the VTOL vehicle 400 includes a fuselage 402, arm assemblies 404*a*, 404*b*, 404*c*, 404*d* (or "arm assemblies 404"), rotor arms 406*a*, 406*b*, 406*c*, 406*d* (or "rotor arms 406"), mounting brackets 407*a*, 407*b*, 407*c*, 407*d* (or "mounting brackets 407"), rotor assemblies 408*a*, 408*b*, 408*c*, 408*d* (or "rotor assemblies 408"), motors 410*a*, 410*b*, 410*c*, 410*d*, a battery 413, and landing legs 414*a*, 414*b* (or "landing legs 414"). Propeller blades are omitted from the VTOL vehicle 400 in the example shown, although in many cases the VTOL vehicle 400 may also include propeller blades coupled to the motors 410*a*, 410*b*, 410*c*, 410*d*.

The rotor arms 406*a*, 406*b*, 406*c*, 406*d* in the example shown are removably coupled to and extend from the fuselage 402 by way of the mounting brackets 407*a*, 407*b*, 407*c*, 407*d*, respectively. The rotor assemblies 408*a*, 408*b*, 408*c*, 408*d* are respectively coupled to the rotor arms 406*a*, 406*b*, 406*c*, 406*d*. Each of the rotor assemblies 408*a*, 408*b*, 408*c*, 408*d* includes a corresponding motor 410*a*, 410*b*, 410*c*, 410*d* and a propeller blade in some examples (not illustrated). Each of the rotor assemblies 408*a*, 408*b*, 408*c*, 408*d* may be controlled remotely (e.g., from a location on the ground) to provide the VTOL vehicle 400 with vertical take-off and landing ability and functionality. The landing legs 414*a*, 414*b* are coupled to a bottom region of the fuselage 402 in the example shown, although either or both of the landing legs 414 may be coupled to a different portion of the VTOL vehicle 400 in other examples.

The VTOL vehicle 400 or one or more components thereof may be fabricated using a 3D printing device and process in some embodiments. For example, at least one of the fuselage 402, the rotor arms 406, the landing legs 414, or the mounting brackets 407 may be fabricated using a 3D printer. At least one of the fuselage 402, the rotor arms 406, or the mounting brackets 407 may be designed such that the rotor arms 406 are attached to the fuselage 402 using swappable mounting brackets 407 (e.g., swappable 3D-printed brackets) to allow for different arm configurations to be interchanged and used on the same fuselage 402. In some cases, such interchangeability of the rotor arms 406 and the mounting brackets 407 allows for testing of various arm configurations to determine the optimal arm length and positioning. The rotor arms 406 can be formed as carbon fiber tubes, which can easily be cut to different lengths. In the example shown, the VTOL vehicle 400 is about 60 centimeters (cm) by 36 cm including the rotor arms 406 and weighs about 1105 grams (g) without the battery 413.

The fuselage 402 is embodied in the example shown as an Aeronautical Research Association/Bocci-Dowty Rotol (ARA-D) 20% airfoil. A major driver of the selection of the ARA-D 20% airfoil is the high thickness of the airfoil. The chord was restricted to 24.36 cm in this example due to 3D printer size constraints, and the battery 413 is 3.5 cm tall. A 24.36 cm chord ARA-D 20% airfoil is thick enough to fit the battery 413, while also accounting for the thickness of the walls of the airfoil (FIG. 4F).

In some examples, the fuselage 402 may be printed in two parts: a top half and a bottom half, so that the top can be easily lifted off to access the electronics within. However, due to 3D printer bed size constraints, in the example shown the fuselage 402 was printed in 4 parts instead: top left, top right, bottom left, and bottom right. Additionally, a hatch may be formed in the top of the fuselage 402 in some cases for easy access to the battery 413.

The fuselage 402 may be designed such that these various parts can be easily attached together and taken apart as needed without interfering too heavily with the aerodynamics of the design. In the example shown, the aforementioned four individually printed pieces of the fuselage 402 interface with each other via lips and grooves with bolts for ease of assembly. The fuselage 402 may be designed such that the two bottom pieces and the two top pieces can be assembled first. This stage of the assembly can be simple because there is easy access to both sides of a bolt: the side with a head (e.g., positioned on the outside of the fuselage 402), and a side with a nut on the inside of the fuselage 402. Designing the fuselage 402 such that the top half and bottom half can be bolted together, and the arm braces (e.g., the mounting brackets 407*a*, 407*b*, 407*c*, 407*d*) can be bolted to the sides of the fuselage 402 may present a challenge because the nuts will be positioned inside the fuselage 402 during assembly, so it may be difficult or impossible to simply hold the nuts in place while screwing in the bolts.

The fuselage 402 may therefore include design features to hold the nuts in place. Threaded inserts are commonly used in situations like this, but threaded bolts of an appropriate size are not readily available. Instead, inside the fuselage 402 shown in this example, around every relevant bolt hole, a small cylindrical area may be extruded to increase the wall thickness, and then a hexagonal hole may be cut into it. The nuts can be heat-inserted into these hexagonal holes to hold them in place (e.g., see Fuselage Manufacturing). All these interfaces can be most easily seen in FIGS. 4F and 4G. The modular design of the fuselage 402 in this example allows for convenient removal, replacement, maintenance, and/or repair of the fuselage 402 or another component of the VTOL vehicle 400. In this example embodiment there are 24 bolt heads on the external surface of the fuselage 402, which may alter the aerodynamics. The fuselage 402 in the example shown also includes 4 holes on the sides to pass wiring into the rotor arms 406, and two recesses on the bottom for the landing legs 414*a*, 414*b* to be inserted. One or more example alternative embodiments of the VTOL vehicle 400 described herein, such as the VTOL vehicles 100, 200, 300, include example alternative fuselage designs relative to the fuselage 402. The alternative fuselage designs of the VTOL vehicles 100, 200, 300 described in embodiments herein provide solutions to above-described assembly challenges and aerodynamic impacts associated with the fuselage 402.

The top half fuselage sections 403*a*, 403*b* and the bottom half fuselage sections 403*c*, 403*d* may be printed from polylactic acid (PLA) and polyethylene terephthalate glycol (PETG) on a 3D printer. Each of the top half fuselage sections 403*a*, 403*b* or the bottom half fuselage sections 403*c*, 403*d* may be printed sitting on its side because this can result in the smoothest, highest quality surface finish. The top half fuselage sections 403*a*, 403*b* and the bottom half fuselage sections 403*c*, 403*d* may then be sanded and filed to remove large blemishes, and the nuts (not illustrated) may be heat-inserted into the hexagonal recesses.

The top half fuselage sections 403*a*, 403*b* may be coupled to one another and the bottom half fuselage sections 403*c*, 403*d* may be coupled to one another. However, it may be difficult to couple the top and bottom halves (e.g., the fuselage sections 403*a*, 403*b*, 403*c*, 403*d*) of the fuselage 402 and the mounting brackets 407*a*, 407*b*, 407*c*, 407*d*, which may be due to some unexpected warping during the printing process. This warping may leave a gap at the front of the fuselage 402 that may be covered by, for instance, tape to maintain smooth airflow over the fuselage 402. One or more example alternative embodiments of the VTOL vehicle 400 described herein such as any of the VTOL vehicles 100, 200, 300 include example alternative fuselage designs to the fuselage 402. The alternative fuselage designs of the VTOL vehicles 100, 200, 300 described in embodiments herein provide solutions to above-described warping challenges that may occur during the printing of the fuselage 402.

In the example shown, the landing legs 414*a*, 414*b* may also be 3D printed and inserted into the bottom region of the fuselage 402. In this example, the rotor arms 406, motor mounts or rotor assemblies 408, and electronics can be installed without difficulty.

Flight testing of the VTOL vehicle 400 was conducted in one example to prove that the airfoil-shaped fuselage concept had significant enough advantages in aerodynamic performance to notably improve power efficiency. The results from this example testing were compared with results from a comparable reference drone (or "reference drone"), which uses the same electronics and weighs a similar amount to the VTOL vehicle 400. Both the VTOL vehicle 400 and the reference drone were tested on the same day and around the same time under similar weather conditions. Data collection was attempted for flight speeds of 5, 7.5, 10, 12.5, and 15 meters per second (m/s) (see Table 1 and Table 2).

Figure 4H:
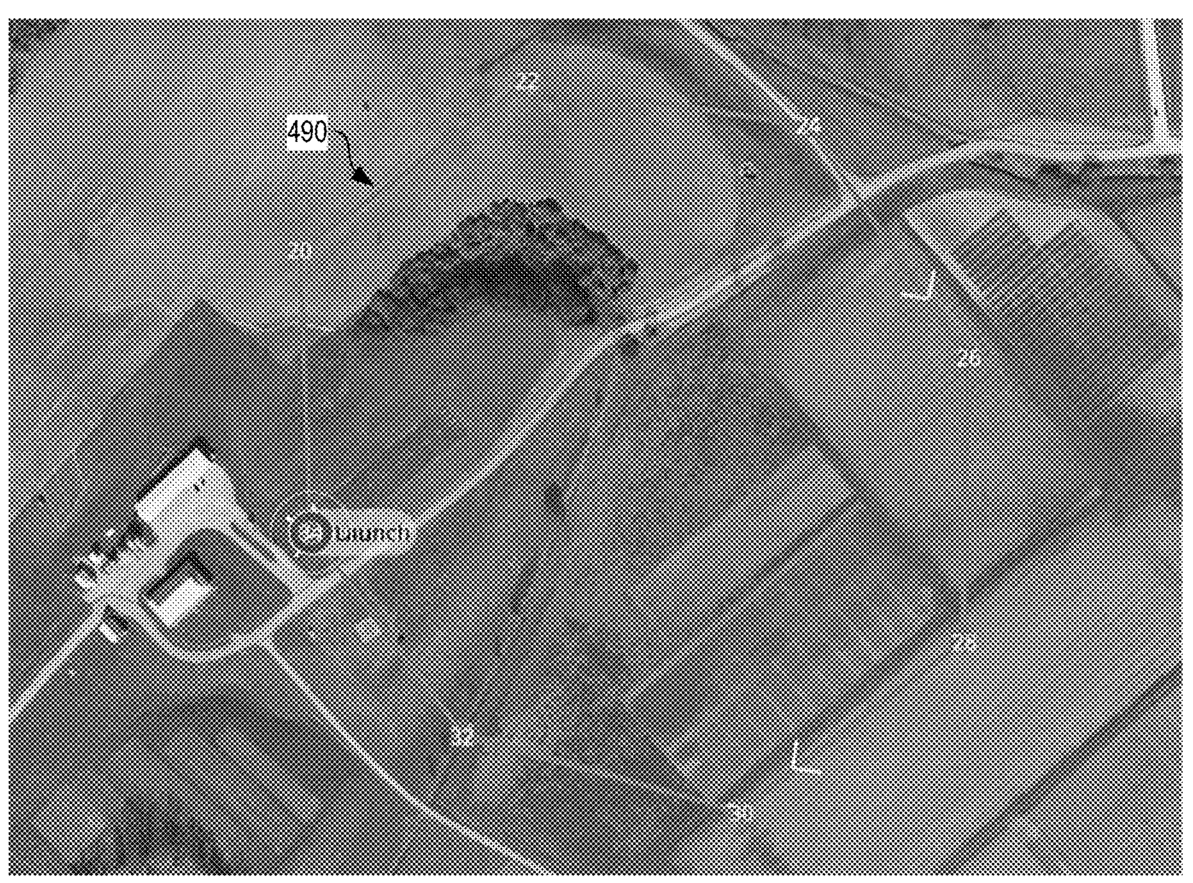
FIG. 4H illustrates a diagram of an example flight plan 490 used to test VTOL vehicles according to various aspects and embodiments of the present disclosure.

In this example test implementation, the VTOL vehicle 400 and the reference drone followed an octagon-shaped flight plan to collect flight test data (see FIG. 4H). FIG. 4H illustrates a diagram of an example flight plan 490 used to test VTOL vehicles according to various aspects and embodiments of the present disclosure. Each cycle included 8 waypoints, forming a loop with 8 straight paths and 8 turns around the waypoints. To achieve smoother turns, the waypoint radius was set to a high value, resulting in an almost circular trajectory that simulates reconnaissance and surveillance operations. The total distance covered per cycle was 1,200 meters, with each leg spanning 150 meters. Altitude was maintained at 25 meters during forward flight to avoid tree cover, and the number of cycles varied between 2 and 3, depending on available battery capacity.

The data collected from the VTOL vehicle 400 in one example test implementation is in Table 1, and the data gathered from the reference drone is in Table 2. These data are the average values taken from the raw data while the drones were flying at the desired speeds.

TABLE 1

Table 1: Example Speed, Current, and Voltage Flight Test Data from the VTOL vehicle 400.

| VTOL Vehicle 400 | | |
|---|---|---|
| Speed (m/s) | Current (A) | Voltage (V) |
| 5.0 | 9.63 | 14.96 |
| 7.5 | 9.64 | 15.15 |
| 10.0 | 8.07 | 15.35 |
| 12.5 | 8.31 | 15.43 |
| 15.0 | 8.97 | 15.45 |

TABLE 2

Table 2: Example Speed, Current, and Voltage Flight Test Data from the reference drone.

| Reference Drone | | |
|---|---|---|
| Speed (m/s) | Current (A) | Voltage (V) |
| 5.0 | 10.83 | 15.2 |
| 7.5 | 10.65 | 15.4 |
| 10.0 | 11.1 | 15.5 |
| 12.5 | 12.68 | 15.46 |
| 15.0 | 13.6 | 15.31 |

The formula, $$P = I * V \quad \text{Equation (1)}$$

where P is power in watts, I is current in amps, and V is voltage in volts, was used in one example to calculate example power values for each drone at each speed (see Table 3 & Table 4).

TABLE 3

Table 3: Example Speed, Current, Voltage, and Power for the VTOL vehicle 400.

| VTOL Vehicle 400 | | | |
|---|---|---|---|
| Speed (m/s) | Current (A) | Voltage (V) | Power (W) |
| 5.0 | 9.63 | 14.96 | 144 |
| 7.5 | 9.64 | 15.15 | 146 |
| 10.0 | 8.07 | 15.35 | 123.87 |
| 12.5 | 8.31 | 15.43 | 128.22 |
| 15.0 | 8.97 | 15.45 | 138.58 |

TABLE 4

Table 4: Example Speed, Current, Voltage, and Power for the reference drone.

| Reference Drone | | | |
|---|---|---|---|
| Speed (m/s) | Current (A) | Voltage (V) | Power (W) |
| 5.0 | 10.83 | 15.2 | 164.62 |
| 7.5 | 10.65 | 15.4 | 164 |
| 10.0 | 11.1 | 15.49 | 171.94 |
| 12.5 | 12.68 | 15.46 | 196.03 |
| 15.0 | 13.59 | 15.31 | 208.06 |

Figure 5:
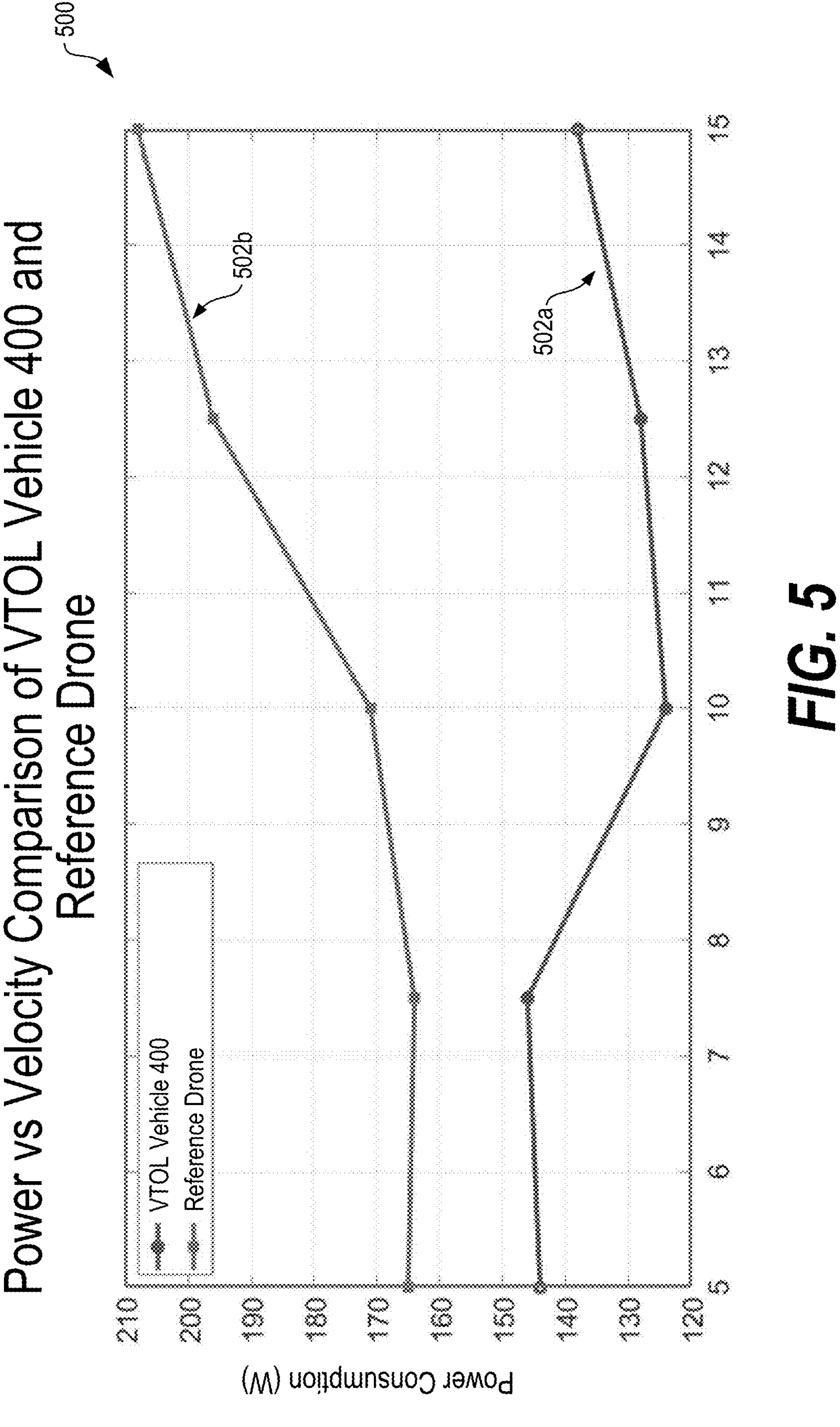
FIG. 5 illustrates a plot of example power-velocity data respectively corresponding to the VTOL vehicle shown in FIG. 4A and a reference drone according to various aspects and embodiments of the present disclosure.
Figure 6A:
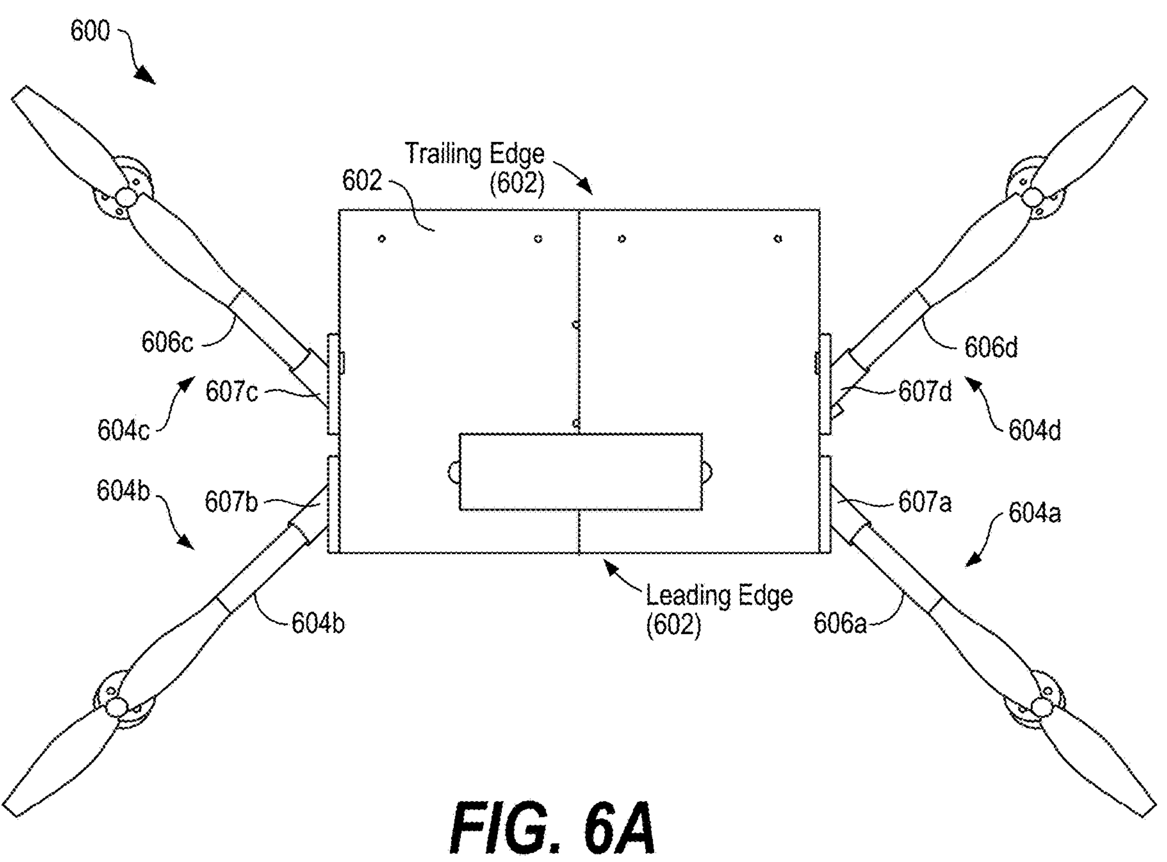
FIG. 6A illustrates a top view of another example VTOL vehicle according to various aspects and embodiments of the present disclosure.
Figure 6B:
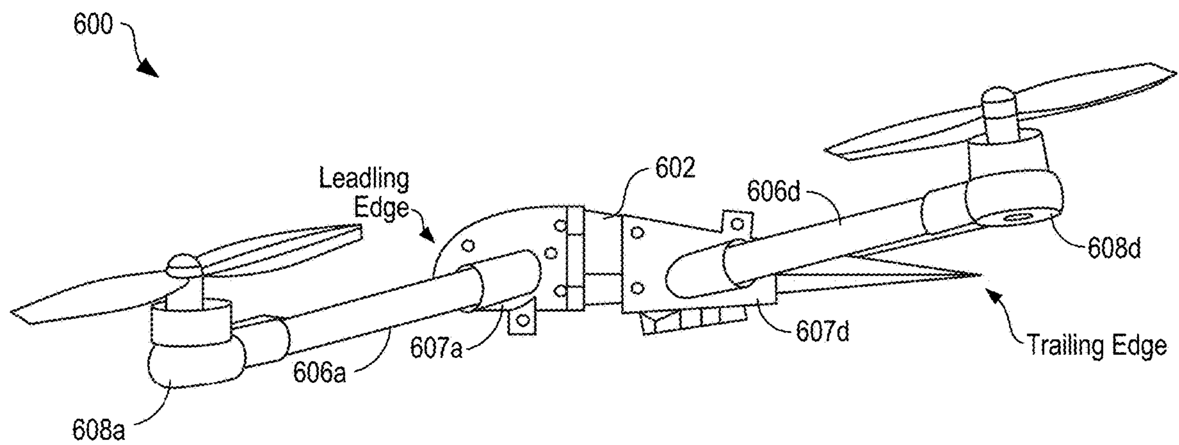
FIG. 6B illustrates a side view of the example VTOL vehicle shown in FIG. 6A according to various aspects and embodiments of the present disclosure.
Figure 6C:
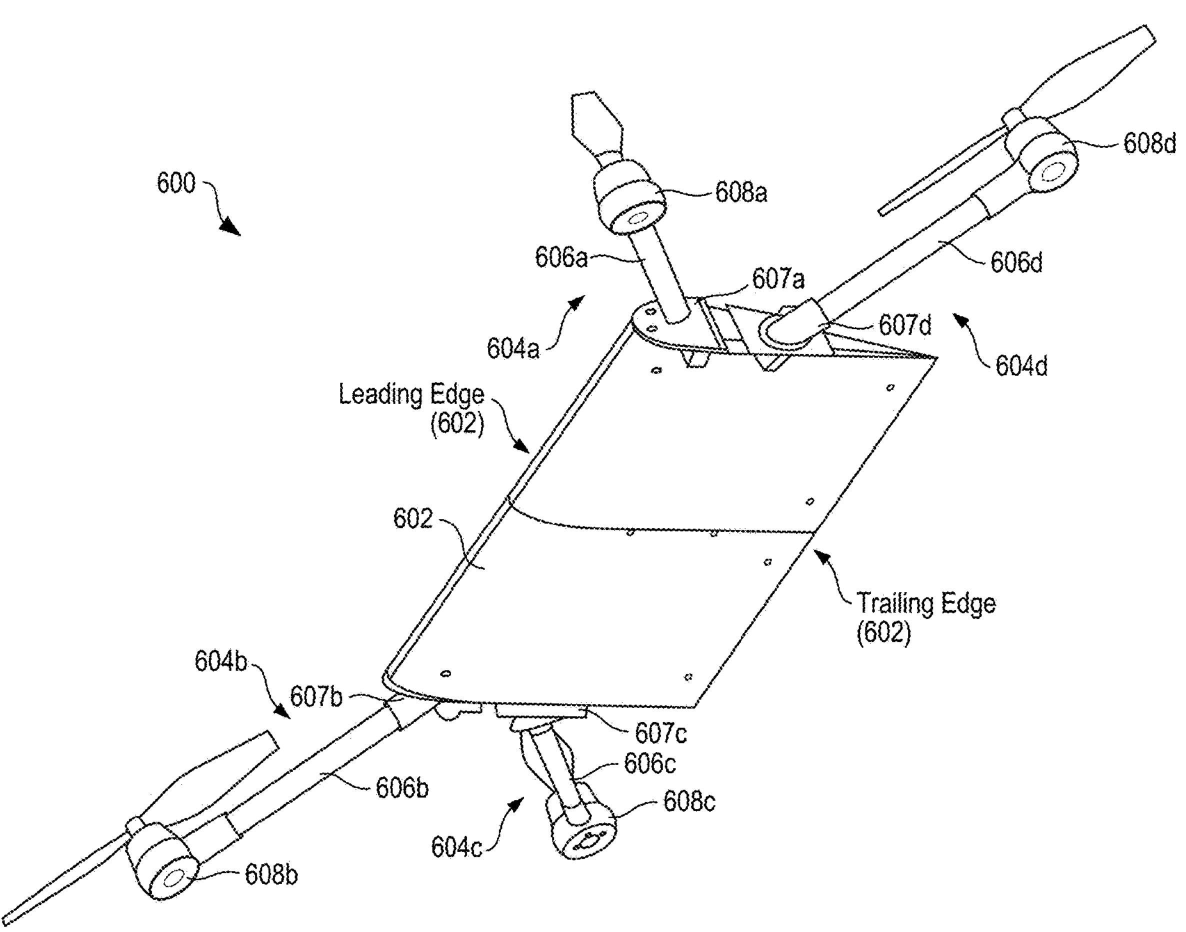
FIG. 6C illustrates a perspective view of the example VTOL vehicle shown in FIG. 6A according to various aspects and embodiments of the present disclosure.
Figure 6D:
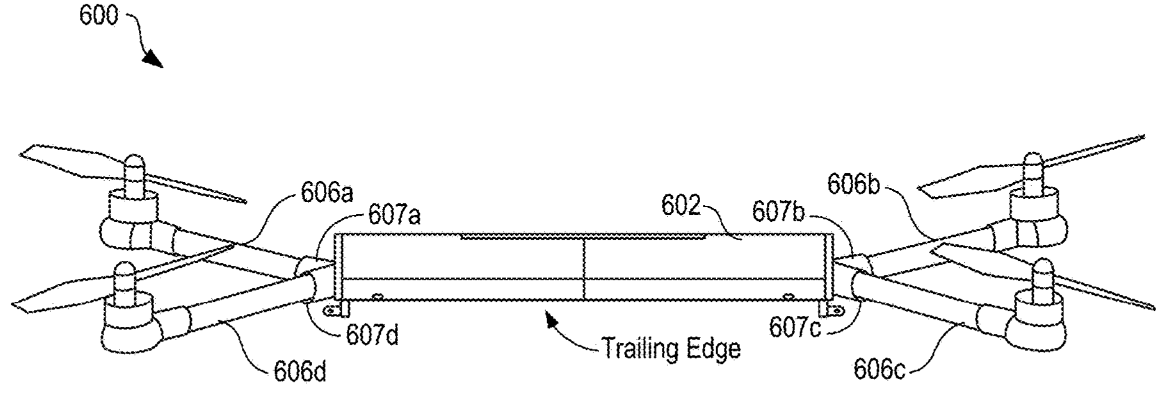
FIG. 6D illustrates a front view of the example VTOL vehicle shown in FIG. 6A according to various aspects and embodiments of the present disclosure.
Figure 7A:
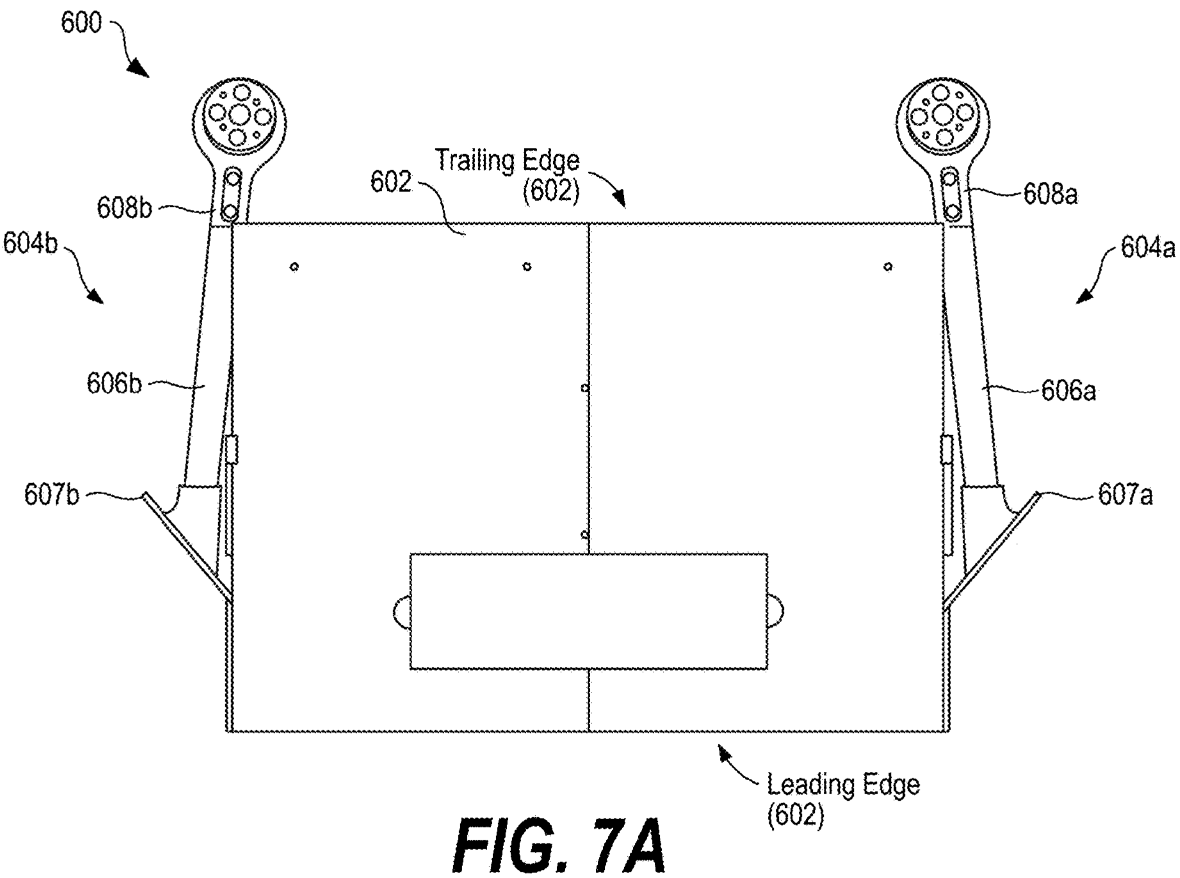
FIG. 7A illustrates a top view of the example VTOL vehicle shown in FIG. 6A in a folded configuration according to various aspects and embodiments of the present disclosure.
Figure 7B:
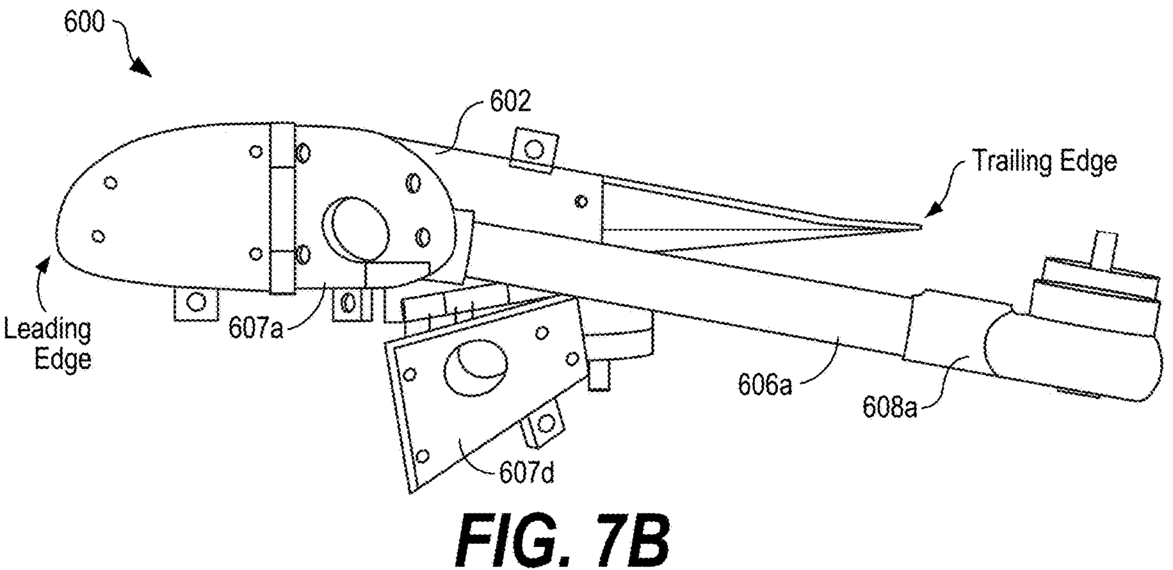
FIG. 7B illustrates a side view of the example VTOL vehicle shown in FIG. 6A in a folded configuration according to various aspects and embodiments of the present disclosure.
Figure 7C:
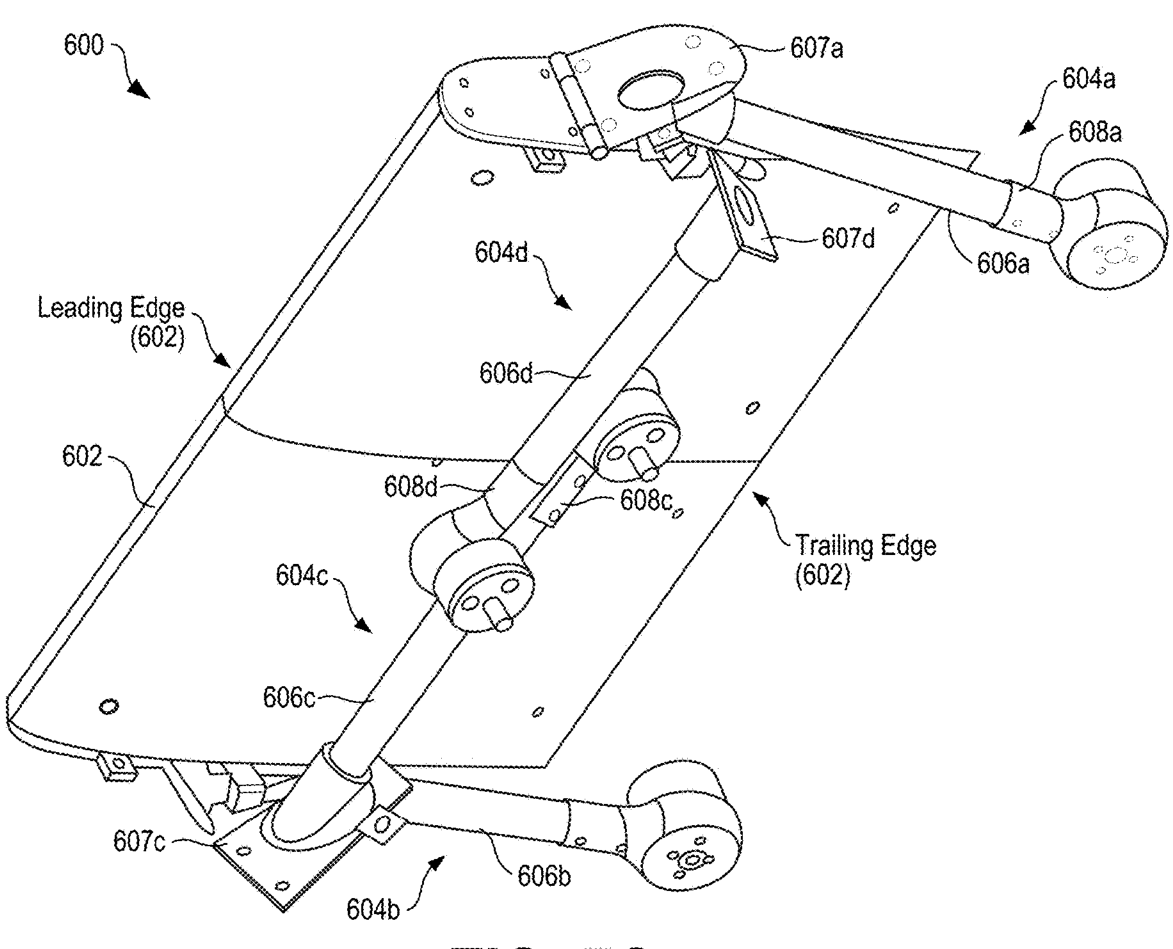
FIG. 7C illustrates a perspective view of the example VTOL vehicle shown in FIG. 6A in a folded configuration according to various aspects and embodiments of the present disclosure.
Figure 7D:
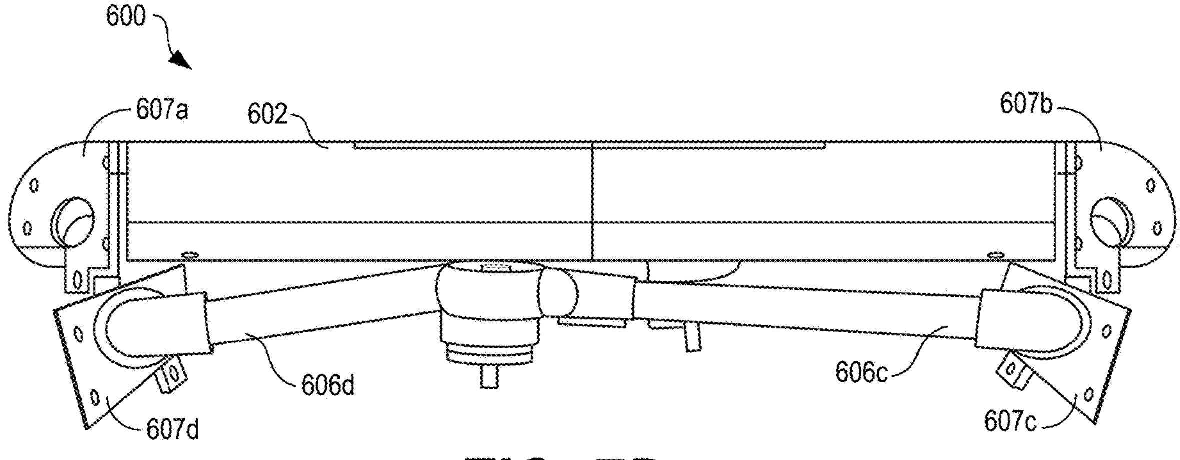
FIG. 7D illustrates a front view of the example VTOL vehicle shown in FIG. 6A in a folded configuration according to various aspects and embodiments of the present disclosure.

Example power vs velocity data for the two drones is plotted as curves 502*a*, 502*b* in plot 500 illustrated in FIG. 5.

As illustrated by the curve 502*a* of the plot 500 in FIG. 5, the VTOL vehicle 400 uses less power as its speed increases, except for a small jump in power from 5 to 7.5 m/s. The reference drone, on the other hand, consistently requires more power as its speed increases, which is illustrated by the curve 502*b* of the plot 500 in FIG. 5. Additionally, as illustrated by the curves 502*a*, 502*b*, the VTOL vehicle 400 uses less power than the reference drone at all tested speeds, and the difference becomes more pronounced as the speed increases. To see just how different the power values are, the percent difference was calculated in one example using Equation (2):

$$\text{Percent Difference} = \frac{|V_1 - V_2|}{\left(\frac{V_1 + V_2}{2}\right)} * 100 \quad \text{Equation (2)}$$

where $V_1$ is reference drone power in watts and $V_2$ is the VTOL vehicle 400 power in watts. The example results obtained in one example are in Table 5 below.

TABLE 5

Table 5: Percentage Power Difference in Example Power Usage Between the VTOL vehicle 400 and the reference drone at all tested flight velocities

| Velocity (m/s) | Reference Drone (W) | VTOL Vehicle (W) | Percentage Power Difference (%) |
|---|---|---|---|
| 5 | 165 | 144 | 13.6 |
| 7.5 | 164 | 146 | 11.6 |
| 10 | 171 | 124 | 31.9 |
| 12.5 | 196 | 128 | 42 |
| 15 | 208 | 138 | 40.5 |

The data provided in the Table 5 proves that the VTOL Vehicle 400 is significantly more energy efficient than reference drone.

The VTOL vehicle 400 handled well throughout the example testing implementations. There were no notable stability or control issues, which is particularly exciting because stability and control issues are a known challenge for BWB aircraft in general.

The results obtained from the above-described experimental and example implementation of the VTOL vehicle 400 are very promising. It seems that the airfoil-shaped fuselage 402 does indeed significantly improve energy efficiency, and stability and control are not major concerns.

In some cases, the design of various aspects of the VTOL vehicle 400 or any of the VTOL vehicles 100, 200, 300 can be optimized to provide further power efficiency in addition to that provided by the airfoil-shaped fuselage 402. For instance, the arm length and configuration of the rotor arms can be optimized based on example test data that can be obtained from flight testing one or more of such VTOL vehicles 100, 200, 300, 400 using different arm mounting angles and arm lengths, as well as pusher prop configurations in some embodiments. The primary measure of merit that may be used to select the best arm configuration may be power minimization in some examples. This experimental and example testing is particularly important because of the difficulty associated with modeling propeller-wing aerodynamic interactions. Going straight to flight testing avoids this issue, at least until much later in the design optimization process.

The experimental and example testing implementations were directly enabled by how the VTOL vehicle 400 was designed. For example, there is no need to print an entire new frame for each configuration; the only components that need to be re-printed in testing various configurations of the rotor arms 406 are the 4 arm mounting brackets 407, which take only about an hour to print each. This significantly increases the speed at which testing of various configurations for the VTOL vehicle 400 can be completed.

Some experimental and example testing implementations may involve wind tunnel testing. An example VTOL vehicle described herein may include a top skin that is larger than a center body of the vehicle, creating wing-like features on the sides of the vehicle. The VTOL vehicle in this example may be designed and embodied such that it resembles a manta ray. For the testing of such a VTOL vehicle according to one implementation, extensions can be added to the top panel. In another example embodiment, the top panel of a VTOL vehicle may be larger with a scalloped shape to accommodate the location of the propellers.

Any of the VTOL vehicles 100, 200, 300, 400 may be embodied in some examples as a composite VTOL vehicle having arms that blend into a fuselage of such a composite VTOL vehicle. Such a composite VTOL vehicle may weigh significantly less, be stronger, have better aerodynamic properties, and be made from fewer parts compared to non-composite embodiments of the VTOL vehicles. Such a composite VTOL vehicle may also provide solutions to challenges such as how to best attach composite parts together while still keeping the design simple to assemble and disassemble, as well as insights into how much blending the arms into the fuselage improves power consumption.

The example monocoque aerostructure quadcopter, BCB quadcopter, and monocoque BCB quadcopter designs described in embodiments herein show great promise for public safety and law enforcement applications. The example VTOL vehicles described in embodiments herein also incorporate positive aspects of monocoque aerostructures, BCB structures, and monocoque BCB structures while avoiding most, if not all, of the negative aspects.

FIGS. 6A to 6D illustrate various views of another example VTOL vehicle 600 according to various aspects and embodiments of the present disclosure. FIGS. 6A, 6B, 6C, and 6D illustrate a top, side, perspective, and front view, respectively, of the example VTOL vehicle 600 according to various aspects and embodiments of the present disclosure. The VTOL vehicle 600 is another alternative example embodiment of the VTOL vehicle 100.

The VTOL vehicle 600 is another representative example embodiment of a monocoque aerostructure quadcopter, a BCB quadcopter, or a monocoque BCB quadcopter of the present disclosure. The illustrations and descriptions of the VTOL vehicle 600 are provided herein for purposes of explanation and are not intended to be all inclusive or exhaustive with respect to other potential components or component configurations that may be implemented in other embodiments of the VTOL vehicle 600. Some embodiments of the VTOL vehicle 600 may include one or more additional or alternative components compared to those shown in FIGS. 6A to 6D. One or more components shown in FIGS. 6A to 6D may also be omitted from some embodiments of the VTOL vehicle 600.

With reference to FIGS. 6A to 6D, the VTOL vehicle 600 includes a fuselage 602, arm assemblies 604*a*, 604*b*, 604*c*, 604*d* (or "arm assemblies 604"), rotor arms 606*a*, 606*b*, 606*c*, 606*d* (or "rotor arms 606"), and mounting brackets 607*a*, 607*b*, 607*c*, 607*d* (or "mounting brackets 607"), among other components. The arm assemblies 604 and the rotor arms 606 in the example shown are removably coupled to and extend from the fuselage 602 by way of corresponding mounting brackets 607. Each of the mounting brackets 607 in the example shown is embodied as a foldable or rotatable mounting bracket. Each of the arm assemblies 604 and the rotor arms 606 is foldable or rotatable by way of corresponding mounting brackets 607 to allow such assemblies to individually fold toward respective sides of the fuselage 602, under or over the fuselage 602, or into a portion of the fuselage 602 in some cases.

FIGS. 7A to 7D illustrate various views of the example VTOL vehicle 600 in an example folded configuration according to various aspects and embodiments of the present disclosure. FIGS. 7A, 7B, 7C, and 7D illustrate a top, side, perspective, and front view, respectively, of the example VTOL vehicle 600 in the example folded configuration according to various aspects and embodiments of the present disclosure.

With reference to FIGS. 6A to 7D, the mounting brackets 607 rotatably couple respective rotor arms 606 of the arm assemblies 604 to the fuselage 602 of the VTOL vehicle 600. One or more of the mounting brackets 607 can include or be embodied as a hinge in many examples. In some examples, any or all of the mounting brackets 607 can be embodied to be removable from the fuselage 602. The mounting brackets 607 in the example shown can also be used to mount, for instance, the rotor arms 406 to the fuselage 402 of the VTOL vehicle 400 described herein and illustrated in FIG. 4A to 4G in some cases.

The VTOL vehicle 600 and the arm configuration of the arm assemblies 604 can be designed and embodied to include a certain geometry or certain dimensions that allow for all components of the VTOL vehicle 600 to be stowed and transported in various spaces having different shapes or sizes. In one example, the VTOL vehicle 600 and the arm configuration of the arm assemblies 604 can be designed and embodied to include a certain geometry or certain dimensions that allow for all components of the VTOL vehicle 600 to be stowed and transported in a case having an approximate size of 20 inches (in)×15 in×4 in. However, the VTOL vehicle 600 and the arm configuration of the arm assemblies 604 may be designed and embodied such that all components of the VTOL vehicle 600 can be stowed and transported in cases having different sizes in some cases. The advantage of such a compact design of the VTOL vehicle 600 is that it may be easily carried on-site and set up by a single operator.

Any of the components of any VTOL vehicle embodiments described in examples herein can be included with any other VTOL vehicle embodiment described herein to produce yet another VTOL vehicle embodiment. For example, VTOL vehicle components such as the airfoil-shaped fuselages, arm assemblies, rotor arms, rotor assemblies, and mounting units described in embodiments herein can be used interchangeably among all the embodiments.

Figure 8:
FIG. 8 illustrates a flow diagram of an example method that can be implemented to fabricate a VTOL vehicle according to various aspects and embodiments of the present disclosure.
Figure 8:
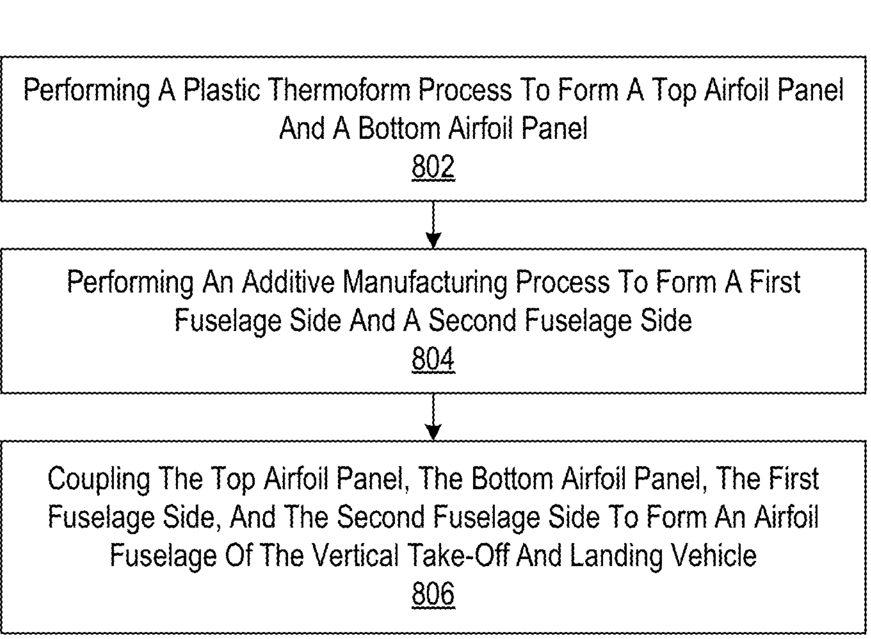

FIG. 8 illustrates a flow diagram of an example method 800 that can be implemented to fabricate a VTOL vehicle according to various aspects and embodiments of the present disclosure. The method 800 can be implemented to fabricate any of the VTOL vehicles described in examples herein such as the VTOL vehicle 100 described herein with reference to FIGS. 1A to 1F. The example embodiment illustrated in FIG. 8 depicts operations performed in a particular order for purposes of illustration and discussion. Those of ordinary skill in the art, using the disclosures provided herein, will understand that various operations or steps of the method 800 or any method disclosed herein can be adapted, modified, rearranged, performed simultaneously, removed, include operations not illustrated, and/or modified in various ways without deviating from the scope of the present disclosure.

At 802, the method 800 includes performing a plastic thermoform process to form a top airfoil panel and a bottom airfoil panel of an airfoil-shaped fuselage for a VTOL vehicle. For example, a vacuum-based thermoform process such as a vacuum forming process can be performed at 802 using acrylonitrile butadiene styrene (ABS) plastic sheets to fabricate the bottom body panel 103*a* and the top body panel 103*b* of the fuselage 102 for the VTOL vehicle 100 described herein with reference to FIGS. 1A to 1F.

At 804, the method 800 includes performing an additive manufacturing process to form a first fuselage side and a second fuselage side of the airfoil-shaped fuselage for the VTOL vehicle. For example, an additive manufacturing process such as a 3D printing process can be performed at 804 to fabricate the fuselage sides 105*a*, 105*b* of the fuselage 102 for the VTOL vehicle 100 described herein with reference to FIGS. 1A to 1F. In many cases a 3D printing process can be performed at 804 to integrally form the mounting units 107 with their corresponding fuselage sides 105.

At 806, the method 800 includes coupling the top airfoil panel, the bottom airfoil panel, the first fuselage side, and the second fuselage side to form the airfoil-shaped fuselage of the VTOL vehicle. For example, a joining (e.g., gluing), fastening, attaching, or other coupling process can be performed at 806 to connect the bottom body panel 103*a*, the top body panel 103*b*, and the fuselage sides 105*a*, 105*b* to form the fuselage 102 for the VTOL vehicle 100 described herein with reference to FIGS. 1A to 1F.

The method 800 in many cases can further include coupling one or more arm and rotor assemblies to the airfoil fuselage. In examples where mounting units are integrally formed with their corresponding fuselage sides at 804, one or more arm and rotor assemblies such as the arm assemblies 104 and the rotor assemblies 108 can be directly coupled (e.g., mechanically, magnetically) to such mounting units. In other examples, mounting units may be first coupled (e.g., mechanically, magnetically) to corresponding fuselage sides, then one or more arm and rotor assemblies such as the arm assemblies 104 and the rotor assemblies 108 can be coupled (e.g., mechanically, magnetically) to such mounting units.

Figure 9:
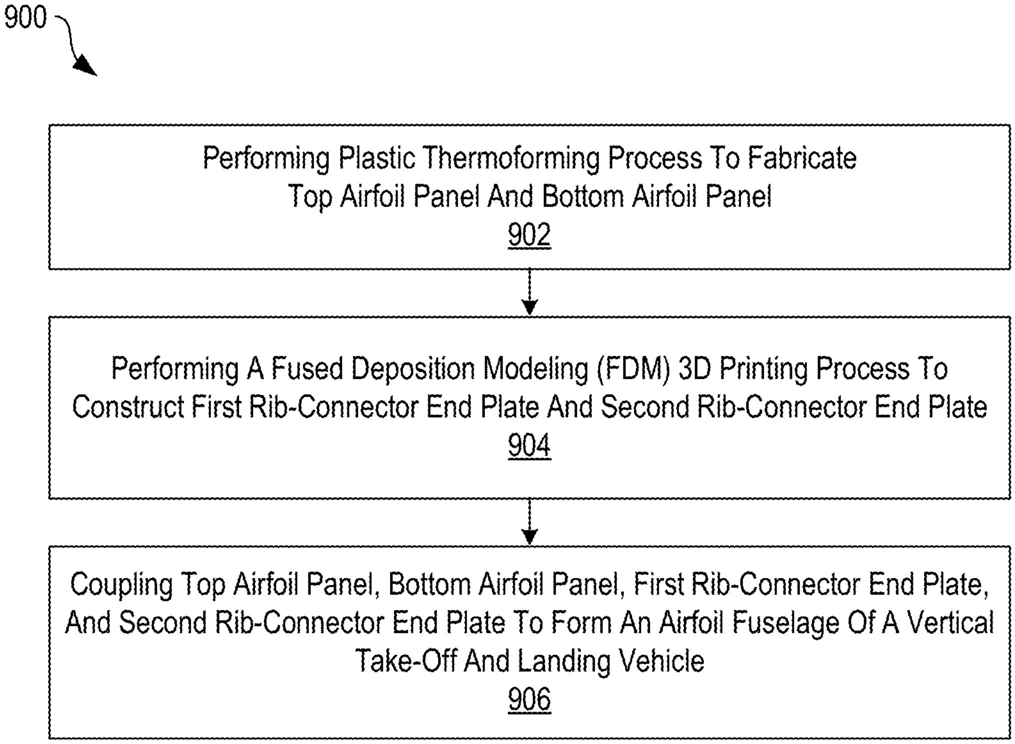
FIG. 9 illustrates a flow diagram of another example method that can be implemented to fabricate a VTOL vehicle according to various aspects and embodiments of the present disclosure.

FIG. 9 illustrates a flow diagram of another example method 900 that can be implemented to fabricate a VTOL vehicle according to various aspects and embodiments of the present disclosure. The method 900 can be implemented to fabricate any of the VTOL vehicles described in examples herein such as the VTOL vehicle 100 described herein with reference to FIGS. 1A to 1F. The example embodiment illustrated in FIG. 9 depicts operations performed in a particular order for purposes of illustration and discussion. Those of ordinary skill in the art, using the disclosures provided herein, will understand that various operations or steps of the method 900 or any method disclosed herein can be adapted, modified, rearranged, performed simultaneously, removed, include operations not illustrated, and/or modified in various ways without deviating from the scope of the present disclosure.

At 902, the method 900 includes performing a plastic thermoforming process to fabricate a top airfoil panel and a bottom airfoil panel of an airfoil-shaped fuselage for a VTOL vehicle. For example, a vacuum-based thermoform process such as a vacuum forming process can be performed at 902 using acrylonitrile butadiene styrene (ABS) plastic sheets to fabricate the bottom body panel 103*a* and the top body panel 103*b* of the fuselage 102 for the VTOL vehicle 100 described herein with reference to FIGS. 1A to 1F.

At 904, the method 900 includes performing a fused deposition modeling (FDM) three-dimensional (3D) printing process to construct a first rib-connector end plate and a second rib-connector end plate. For example, an FDM 3D printing process can be performed at 904 to fabricate the fuselage sides 105*a*, 105*b* of the fuselage 102 for the VTOL vehicle 100 described herein with reference to FIGS. 1A to 1F. In many cases an FDM 3D printing process can be performed at 904 to integrally form the mounting units 107 with their corresponding fuselage sides 105.

At 906, the method 900 includes coupling the top airfoil panel, the bottom airfoil panel, the first rib-connector end plate, and the second rib-connector end plate to form the airfoil-shaped fuselage of the VTOL vehicle. For example, a joining (e.g., gluing), fastening, attaching, or other coupling process can be performed at 906 to connect the bottom body panel 103*a*, the top body panel 103*b*, and the fuselage sides 105*a*, 105*b* to form the fuselage 102 for the VTOL vehicle 100 described herein with reference to FIGS. 1A to 1F.

The method 900 in many cases can further include coupling one or more arm and rotor assemblies to the airfoil fuselage. In examples where mounting units are integrally formed with their corresponding fuselage sides at 904, one or more arm and rotor assemblies such as the arm assemblies 104 and the rotor assemblies 108 can be directly coupled (e.g., mechanically, magnetically) to such mounting units. In other examples, mounting units may be first coupled (e.g., mechanically, magnetically) to corresponding fuselage sides, then one or more arm and rotor assemblies such as the arm assemblies 104 and the rotor assemblies 108 can be coupled (e.g., mechanically, magnetically) to such mounting units.

Disjunctive language, such as the phrase "at least one of X, Y, or Z," unless specifically stated otherwise, is to be understood with the context as used in general to present that an item, term, or the like, can be either X, Y, or Z, or any combination thereof (e.g., X, Y, and/or Z). Thus, such disjunctive language is not generally intended to, and should not, imply that certain embodiments require at least one of X, at least one of Y, or at least one of Z to be each present. As referenced herein in the context of quantity, the terms "a" or "an" are intended to mean "at least one" and are not intended to imply "one and only one."

As referred to herein, the terms "include," "includes," and "including" are intended to be inclusive in a manner similar to the term "comprising." As referenced herein, the terms "or" and "and/or" are generally intended to be inclusive, that is (i.e.), "A or B" or "A and/or B" are each intended to mean "A or B or both." As referred to herein, the terms "first," "second," "third," and so on, can be used interchangeably to distinguish one component or entity from another and are not intended to signify location, functionality, or importance of the individual components or entities. As referenced herein, the terms "couple," "couples," "coupled," and/or "coupling" refer to chemical coupling (e.g., chemical bonding), communicative coupling, electrical and/or electromagnetic coupling (e.g., capacitive coupling, inductive coupling, direct and/or connected coupling), mechanical coupling, operative coupling, optical coupling, and/or physical coupling.

It should be emphasized that the above-described embodiments of the present disclosure are merely possible examples of implementations set forth for a clear understanding of the principles of the disclosure. Many variations and modifications can be made to the above-described embodiment(s) without departing substantially from the spirit and principles of the disclosure. All such modifications and variations are intended to be included herein within the scope of this disclosure and protected by the following claims.

The invention claimed is:

1. A vertical take-off and landing vehicle, comprising:

an airfoil-shaped fuselage comprising a leading end having a leading edge at a front of the airfoil-shaped fuselage, a trailing end having a trailing edge at a back of the airfoil-shaped fuselage, and a fuselage side extending from the leading end to the trailing end;

a first rotor arm extending from the fuselage side in a first horizontal plane; and a second rotor arm extending from the fuselage side in a second horizontal plane that is vertically below the first horizontal plane, wherein:

the leading edge is positioned in a horizontal plane that is vertically above the first horizontal plane, and the trailing edge is positioned in a horizontal plane that is vertically below the second horizontal plane.

2. The vertical take-off and landing vehicle of claim 1, wherein:

the airfoil-shaped fuselage further comprises a second fuselage side positioned opposite the fuselage side and extending from the leading end to the trailing end; and the vertical take-off and landing vehicle further comprises a third rotor arm and a fourth rotor arm extending from the second fuselage side in the first horizontal plane and the second horizontal plane, respectively.

3. The vertical take-off and landing vehicle of claim 1, wherein at least one of the first rotor arm or the second rotor arm is at least one of rigidly, pivotably, rotatably, or slidably coupled to the fuselage side.

4. The vertical take-off and landing vehicle of claim 1, further comprising:

a power storage system; and at least one solar panel mechanically coupled to a top side of the airfoil-shaped fuselage and electrically coupled to the power storage system.

5. The vertical take-off and landing vehicle of claim 1, further comprising:

a rotor assembly coupled to a distal end of the first rotor arm; and a landing leg coupled to a bottom side of the rotor assembly.

6. The vertical take-off and landing vehicle of claim 1, further comprising at least one landing leg coupled to a bottom side of the airfoil-shaped fuselage.

7. The vertical take-off and landing vehicle of claim 1, wherein the airfoil-shaped fuselage comprises at least one of a monocoque aerostructure fuselage, a blended center body fuselage, a blended wing body fuselage, a monocoque blended center body fuselage, or a monocoque blended wing body fuselage.

8. The vertical take-off and landing vehicle of claim 1, wherein the vertical take-off and landing vehicle comprises a monocoque aerostructure quadcopter, a blended center body quadcopter, a blended wing body quadcopter, a monocoque blended center body quadcopter, or a monocoque blended wing body quadcopter.

* * * * *